United States Patent
Hassan et al.

(10) Patent No.: US 9,216,471 B2
(45) Date of Patent: Dec. 22, 2015

(54) CONNECTOR FOR ARC WELDING CONDUCTOR TUBE FOR GMAW MANUAL/ROBOTIC ARC WELDING MIG GUNS

(71) Applicant: Victor Equipment Company, Denton, TX (US)

(72) Inventors: Khalid Hassan, Denton, TX (US); Glenn Redding, Flower Mound, TX (US)

(73) Assignee: Victor Equipment Company, Denton, TX (US)

( * ) Notice: Subject to any disclaimer, the term of this patent is extended or adjusted under 35 U.S.C. 154(b) by 332 days.

(21) Appl. No.: 13/674,852

(22) Filed: Nov. 12, 2012

(65) Prior Publication Data

US 2013/0134143 A1    May 30, 2013

Related U.S. Application Data

(60) Provisional application No. 61/559,111, filed on Nov. 13, 2011.

(51) Int. Cl.
*B23K 9/29* (2006.01)
*B23K 9/173* (2006.01)
*B23K 9/26* (2006.01)
*B23K 9/28* (2006.01)

(52) U.S. Cl.
CPC ............... *B23K 9/295* (2013.01); *B23K 9/173* (2013.01); *B23K 9/26* (2013.01); *B23K 9/28* (2013.01); *B23K 9/291* (2013.01)

(58) Field of Classification Search
CPC ............. B23K 9/16; B23K 9/24; B23K 9/28; B23K 9/29
USPC .................. 219/137.2, 137.42, 137.61
See application file for complete search history.

(56) References Cited

U.S. PATENT DOCUMENTS

| | | |
|---|---|---|
| 1,578,033 A | 3/1926 | Hohl |
| 1,933,938 A | 11/1933 | Schnetzer |
| 2,051,284 A | 8/1936 | Ball |
| 2,442,798 A | 6/1948 | Crabtree |
| 2,690,542 A | 9/1954 | Pearce et al. |
| 3,265,856 A | 8/1966 | Cecil |
| 3,302,195 A | 1/1967 | Fuller |
| 3,488,468 A | 1/1970 | Carbone |
| 3,517,371 A | 6/1970 | Buckley |

(Continued)

FOREIGN PATENT DOCUMENTS

| | | |
|---|---|---|
| AT | 411 881 | 9/2002 |
| JP | 61182886 | 8/1986 |

OTHER PUBLICATIONS

PCT Serial No. PCT/US2012/064695—Notification of Transmittal of the International Search Report and the Written Opinion of the International Searching Authority, Dated Mar. 8, 2013.

*Primary Examiner* — Brian Jennison
(74) *Attorney, Agent, or Firm* — Kacvinsky Daisak Bluni PLLC

(57) ABSTRACT

An arc welding apparatus comprising a conductor tube defining an internal passageway is disclosed. The conductor tube further defines an external surface profile and a distal end portion. The conductor tube is configured to engage a sleeve having inner and outer surface profiles. The inner surface profile is configured to abut the external surface profile of the conductor tube, and the outer surface profile comprises an engaging portion.

18 Claims, 33 Drawing Sheets

(56) References Cited

U.S. PATENT DOCUMENTS

| | | |
|---|---|---|
| 3,562,482 A | 2/1971 | Friedberg |
| 3,596,049 A | 7/1971 | Ogden |
| 3,601,764 A | 8/1971 | Cameron |
| 3,783,233 A | 1/1974 | dal Molin |
| 3,813,512 A | 5/1974 | Nordgren |
| 3,825,720 A | 7/1974 | Zillinger, Jr. |
| 3,869,186 A | 3/1975 | Vetter |
| 3,917,373 A | 11/1975 | Peterson |
| 4,158,763 A | 6/1979 | Moerke |
| 4,255,007 A | 3/1981 | Michaels et al. |
| 4,284,313 A | 8/1981 | Anhalt |
| 4,343,526 A | 8/1982 | Hobson et al. |
| 4,429,938 A | 2/1984 | Flor |
| 4,531,802 A | 7/1985 | Tomsa |
| 4,629,272 A | 12/1986 | Mattingly et al. |
| 4,733,052 A | 3/1988 | Nilsson et al. |
| 4,820,185 A | 4/1989 | Moulin |
| 1,903,751 A | 4/1993 | Horn |
| 5,215,476 A | 6/1993 | Rector |
| 5,338,917 A | 8/1994 | Stuart et al. |
| 5,380,980 A | 1/1995 | Colling |
| 5,635,091 A | 6/1997 | Hori et al. |
| 5,662,488 A | 9/1997 | Alden |
| 5,726,420 A | 3/1998 | Lajoie |
| 5,760,373 A | 6/1998 | Colling |
| 5,974,917 A * | 11/1999 | Way ............................ 81/124.1 |
| 5,998,760 A | 12/1999 | Kunz |
| 6,011,237 A | 1/2000 | Yang |
| 6,163,008 A | 12/2000 | Roberts et al. |
| 6,226,068 B1 | 5/2001 | Arcykiewicz et al. |
| 6,307,179 B1 | 10/2001 | Walters, III |
| 6,634,897 B2 | 10/2003 | Cykon et al. |
| 6,666,701 B1 | 12/2003 | Burkhardt et al. |
| 6,689,987 B2 | 2/2004 | Altekruse et al. |
| 6,713,711 B2 | 3/2004 | Conway et al. |
| 6,847,009 B2 | 1/2005 | Stuart et al. |
| 6,852,950 B2 | 2/2005 | Giese |
| 6,943,318 B2 | 9/2005 | Takagi et al. |
| 6,987,237 B2 | 1/2006 | Walters |
| 6,995,331 B2 | 2/2006 | Samler |
| 7,025,616 B2 | 4/2006 | Hopper |
| 7,176,412 B2 | 2/2007 | Wells |
| 7,271,366 B2 | 9/2007 | Kensrue |
| 7,322,859 B2 | 1/2008 | Evans |
| 7,367,833 B2 | 5/2008 | Matsumoto |
| 7,381,923 B2 | 6/2008 | Gordon et al. |
| 7,663,074 B2 | 2/2010 | Wells |
| 7,740,499 B1 | 6/2010 | Willey et al. |
| 7,866,992 B2 | 1/2011 | Pfeiffer |
| 8,025,528 B2 | 9/2011 | Smith |
| 8,079,855 B2 | 12/2011 | Pfeiffer |
| 2007/0108173 A1 * | 5/2007 | Zamuner .................. 219/137.31 |
| 2007/0210049 A1 | 9/2007 | Dingeldein |
| 2009/0294427 A1 | 12/2009 | Matthews et al. |
| 2011/0006522 A1 * | 1/2011 | Bichler et al. ................ 285/420 |

* cited by examiner

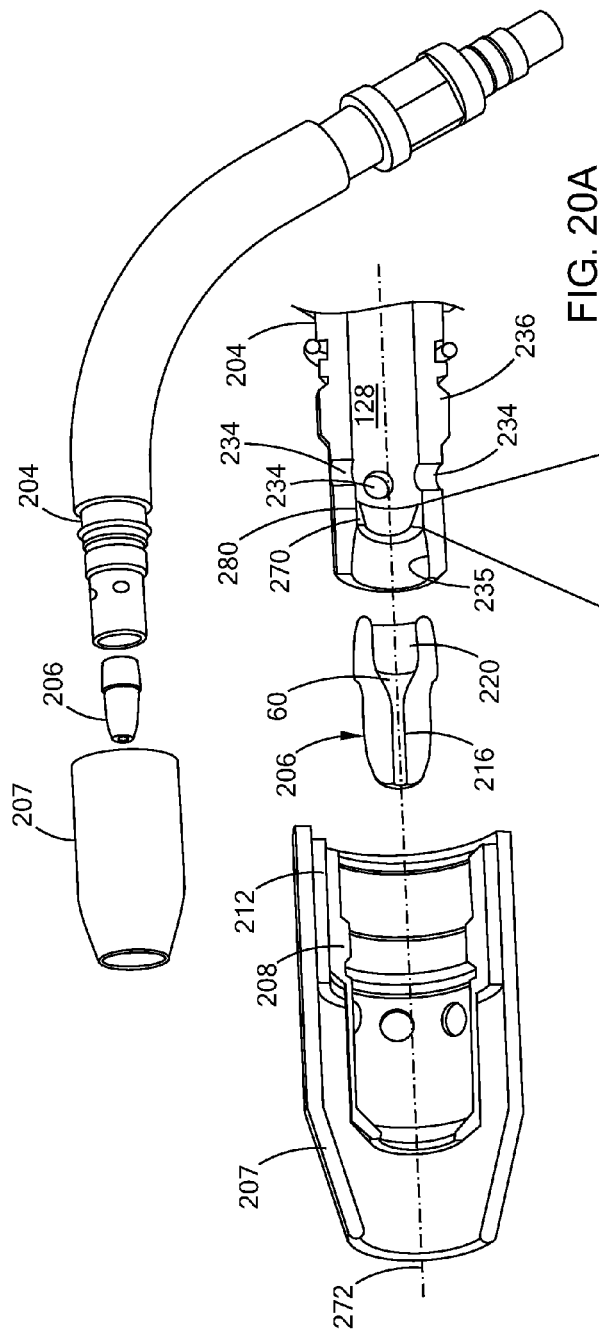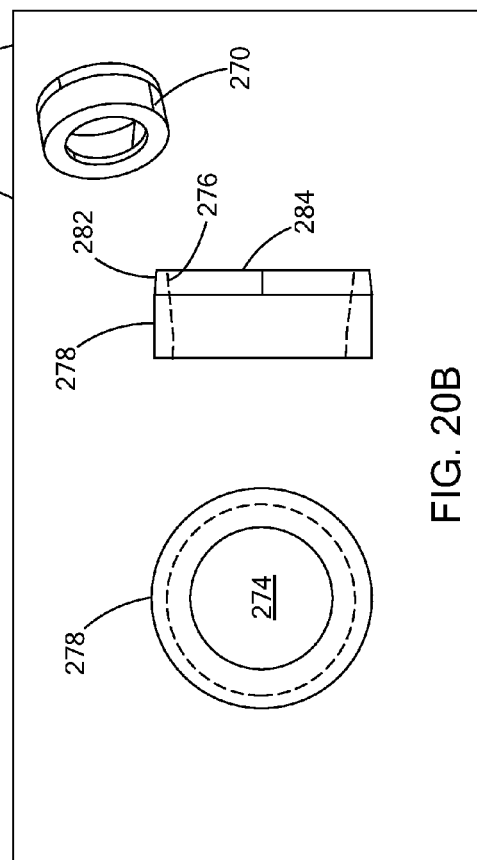

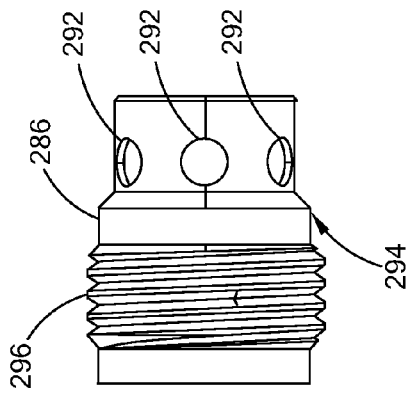
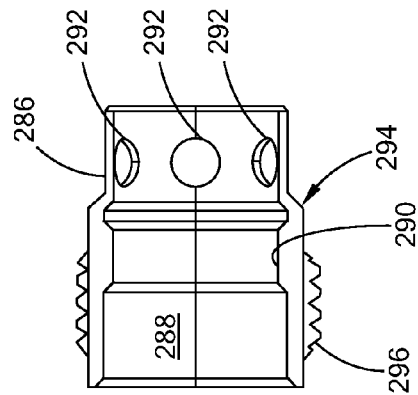
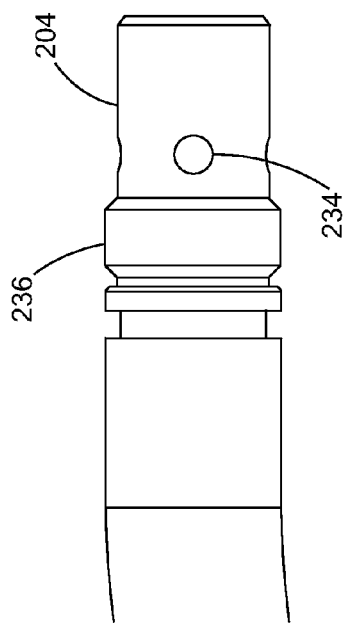
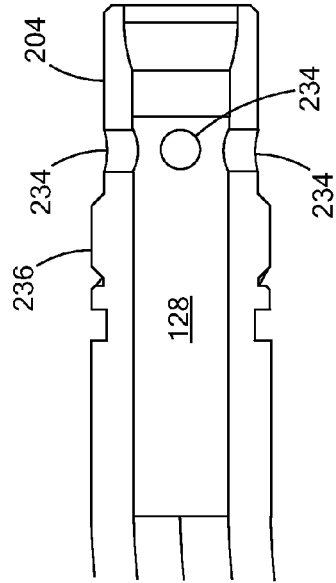
FIG. 21A
FIG. 21B

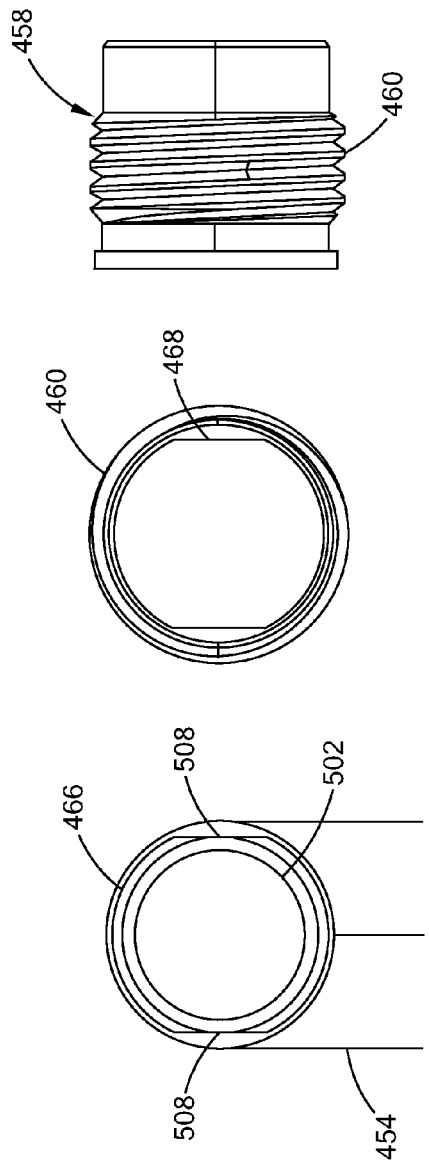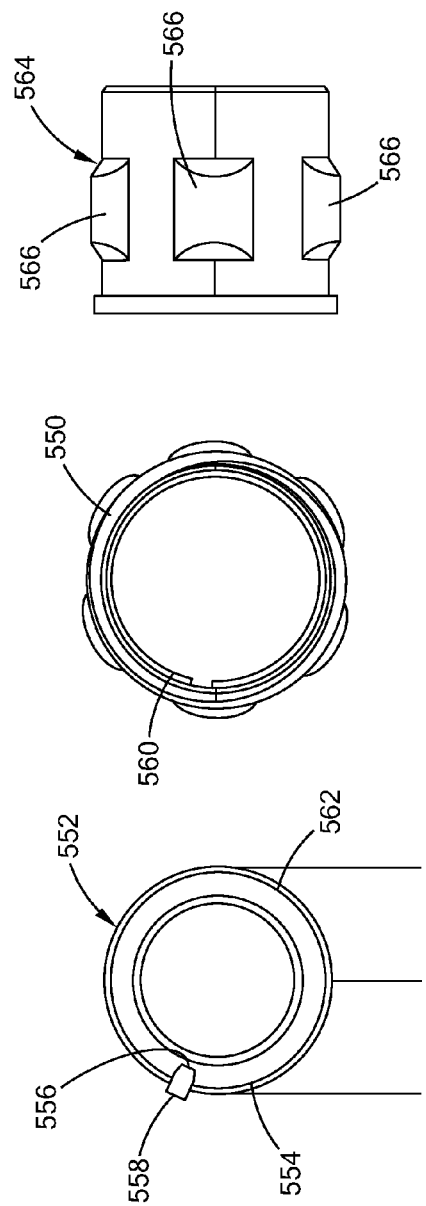

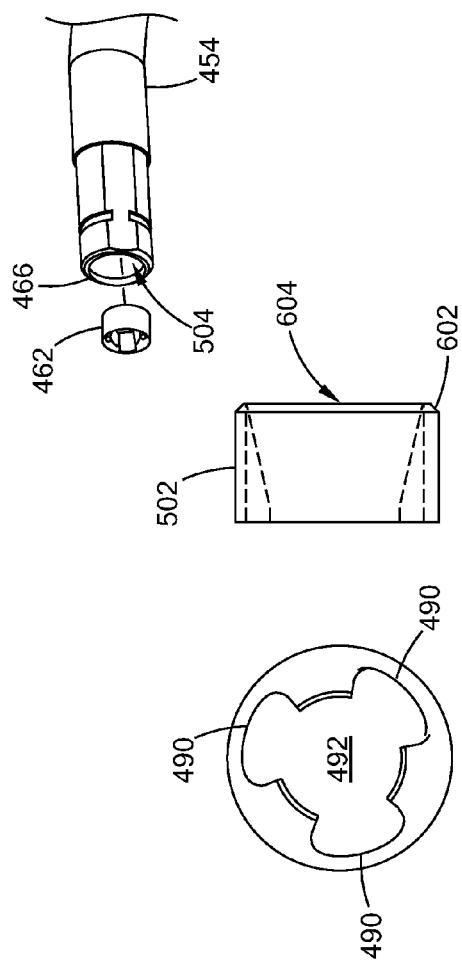
FIG. 33A
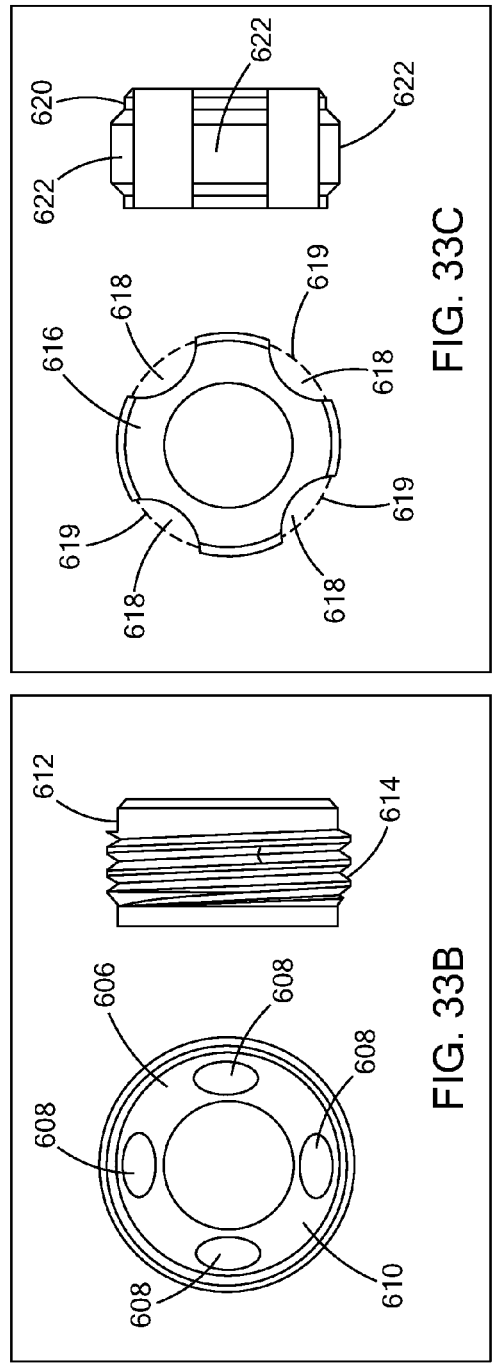
FIG. 33C
FIG. 33B

CONNECTOR FOR ARC WELDING CONDUCTOR TUBE FOR GMAW MANUAL/ROBOTIC ARC WELDING MIG GUNS

CROSS-REFERENCE TO RELATED APPLICATIONS

This application is a non-provisional of U.S. Application No. 61/559,111, filed on Nov. 13, 2011. The disclosures of the above application are incorporated herein by reference.

FIELD

The present disclosure relates generally to welding apparatuses, and more particularly to arc welding apparatuses such as Metal Insert Gas (MIG) or Gas Metal Arc Welding (GMAW) welding guns including consumables for generating welding arc and diffusing shield gas.

BACKGROUND

The statements in this section merely provide background information related to the present disclosure and may not constitute prior art.

In an arc welding apparatus, such as Metal Insert Gas (MIG) or Gas Metal Arc Welding (GMAW) welding gun, a welding wire is fed through the welding gun to provide a molten metal pool to join metal workpieces together. An inert gas is directed through the front (distal) end of the welding gun to provide a surrounding layer or blanket of shielding gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the workpieces. The contact tip transfers electrical current to the welding wire. The gas diffuser is threaded to the contact tip and defines gas passageways to direct the shielding gas into forming the blanket of shielding gas around the molten metal pool. The contact tip and gas diffuser are constantly subjected to high heat and are susceptible to wear due to high temperature operation.

SUMMARY

The present disclosure generally provides a connector for a welding conductor tube for an arc welding apparatus, such as an MIG or GMAW welding gun with an increased life. The various forms of the present disclosure provide a simplified structure, more uniform heat distribution and improved cooling to improve life.

In one form, an arc welding apparatus includes a conductor tube having an internal passageway, an external surface profile, and a distal end portion. The conductor tube is configured to engage a sleeve having inner and outer surface profiles. The inner surface profile is configured to abut the external surface profile of the conductor tube, and the outer surface profile includes an engaging portion. The apparatus provides for increased life of the conductor tube by the addition of a wear resistant or disposable sleeve.

In another form, an arc welding apparatus is disclosed comprising a conductor tube defining an internal passageway. The conductor tube further incorporates an external surface profile, a distal end and an engaging portion defining cam-lock connection parts. In one from, the cam-lock parts of the conductor tube are configured to connect the conductor tube to the inner body of a nozzle.

In still another form, an arc welding apparatus is disclosed including a conductor tube defining an internal passageway comprising an external surface profile and a distal end. The arc welding apparatus further includes a sleeve having inner and outer surface profiles. The inner surface profile is configured to abut the external surface profile of the conductor tube, and the outer surface profile includes a connection surface configured for mechanical connection. The arc welding apparatus also includes a nozzle having an inner body comprising an inner profile configured to mechanically attach to the connection surface of the sleeve. The inner body further includes a distal end having an internal distal flange. Finally in this form, the arc welding apparatus includes a contact tip comprising an external shoulder configured to abut the internal distal flange to secure and position the contact tip.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 20A is a partially exploded profile and cross-sectional view of an arc welding apparatus constructed in accordance with a third embodiment of the present disclosure, and FIG. 20B is a detailed view of an embodiment of the centering device constructed in accordance with a third embodiment of the present disclosure;

FIG. 21A is a partially exploded profile view of the conductor tube and adaptor sleeve of an arc welding apparatus constructed in accordance with a third embodiment of the present disclosure, and FIG. 21B is a partially exploded cross-sectional view of the conductor tube and adaptor sleeve of an arc welding apparatus constructed in accordance with a third embodiment of the present disclosure;

FIG. 31A is a detail view of a conductor tube and a sleeve constructed in accordance with a seventh embodiment of the present disclosure and FIG. 31B is a detail view conductor tube and sleeve demonstrating an alternate conductor tube and sleeve related to the seventh embodiment of the present disclosure;

Figure 32:
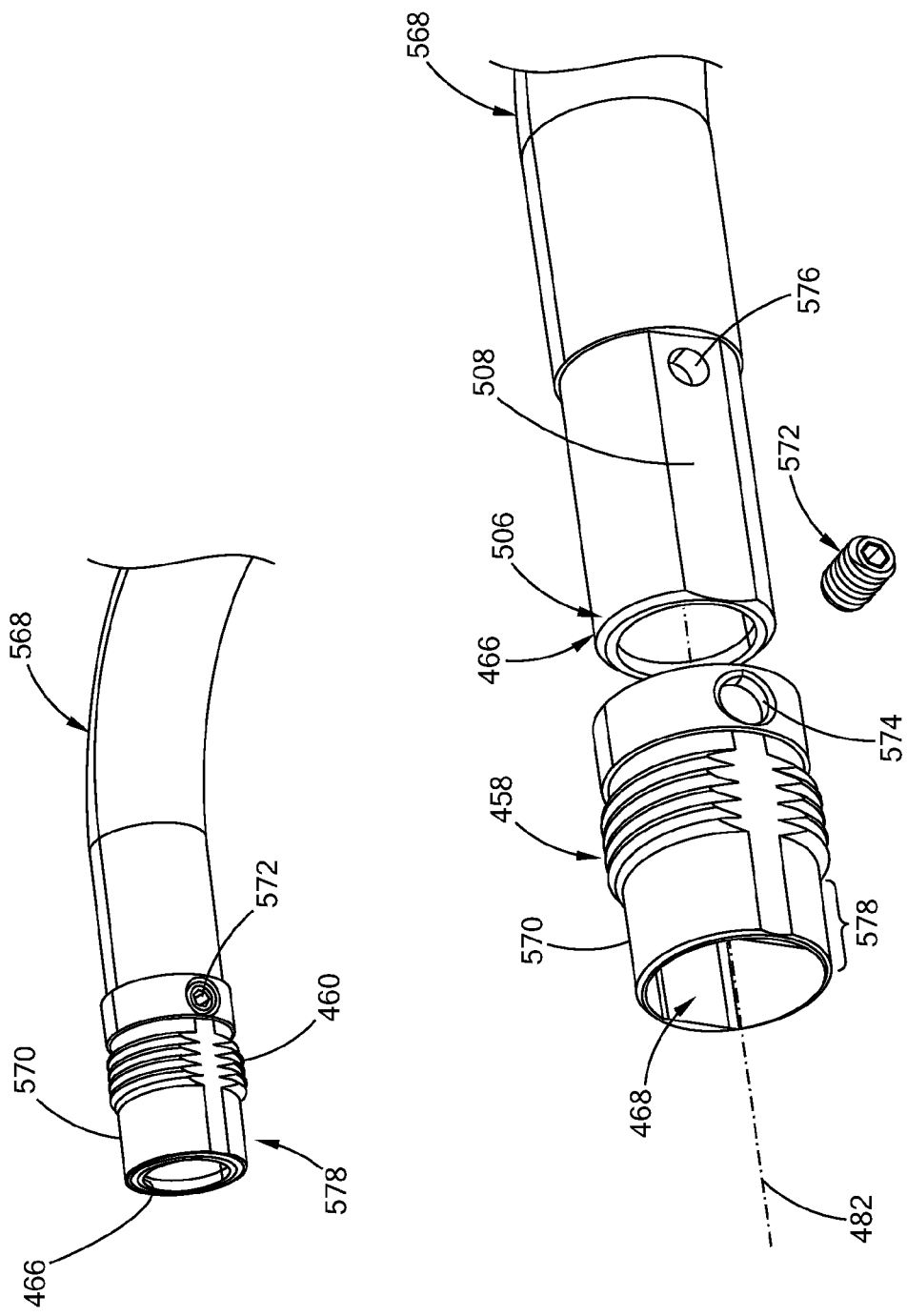

FIG. 32 is perspective view and a partial exploded perspective view of a consumable assembly and a conductor tube constructed demonstrating an alternate conductor tube and sleeve related to the seventh embodiment of the present disclosure; and FIG. 33A is a detail view of an alignment device constructed in accordance with a seventh embodiment of the present disclosure and FIGS. 33B and 33C are detail views of alignment devices demonstrating alternate conductor configurations related to the seventh embodiment of the present disclosure.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features. And although the term "MIG" or "GMAW" is used throughout the specification, it should be understood that the teachings of the present disclosure apply to any type of welding gun.

Figure 1:
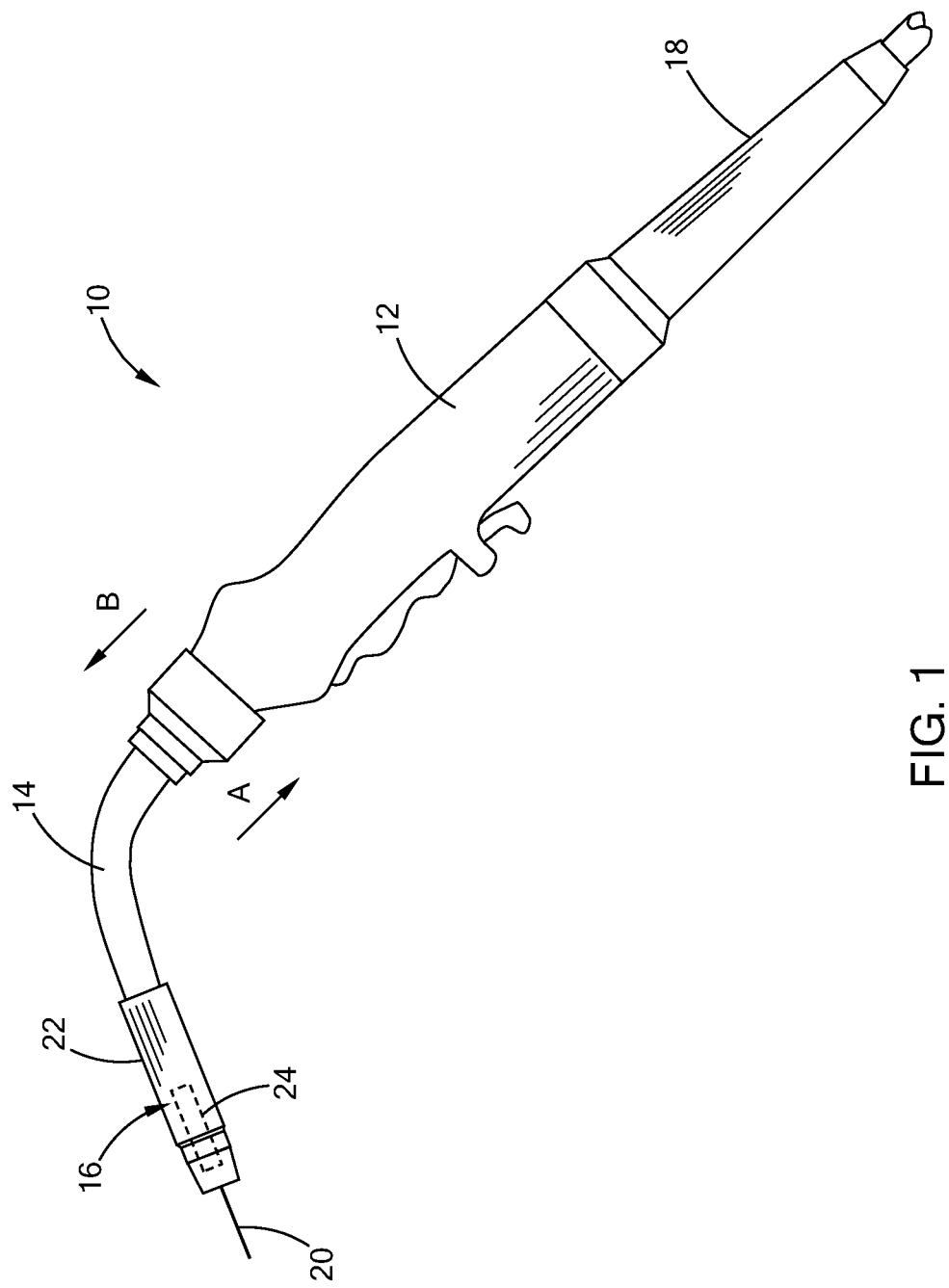
FIG. 1 is a side view of an arc welding apparatus including a contact tip-diffuser constructed in accordance with the teachings of the present disclosure.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shielding gas, and a welding wire 20 from a power source (not shown), a gas source (not shown), and a wire feeder (not shown) to the welding gun 10.

The consumable assembly 16 includes a plurality of consumable components and generally includes a nozzle 22 and a contact tip-diffuser 24 disposed inside the nozzle 22 according to a first embodiment of the present disclosure. The structure and operation of the arc welding apparatus has been disclosed in U.S. Pat. Nos. 5,491,321 and 5,338,917, which are commonly owned by the assignee of the present application, and the contents of which are incorporated herein by reference in their entirety.

Figure 2:
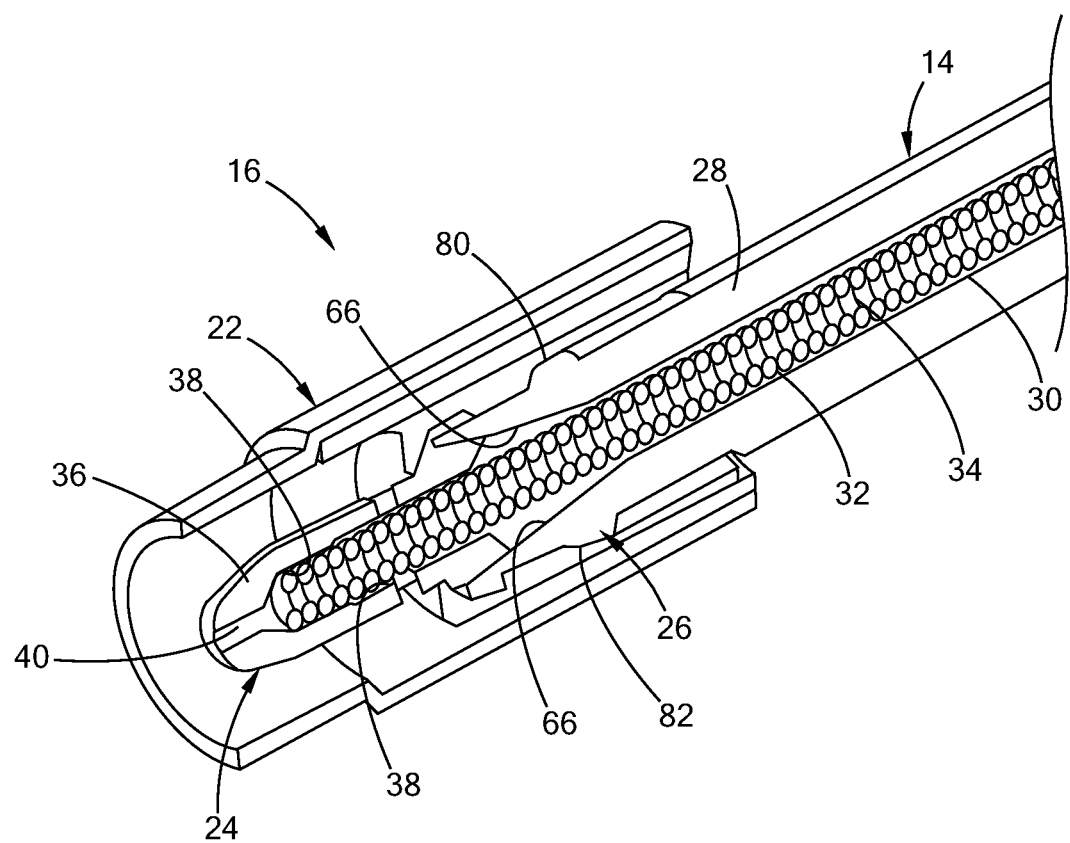
FIG. 2 is a cross-sectional perspective view of a consumable assembly connected to a conductor tube and having a contact tip-diffuser constructed in accordance with a first embodiment of the present disclosure.
Figure 4:
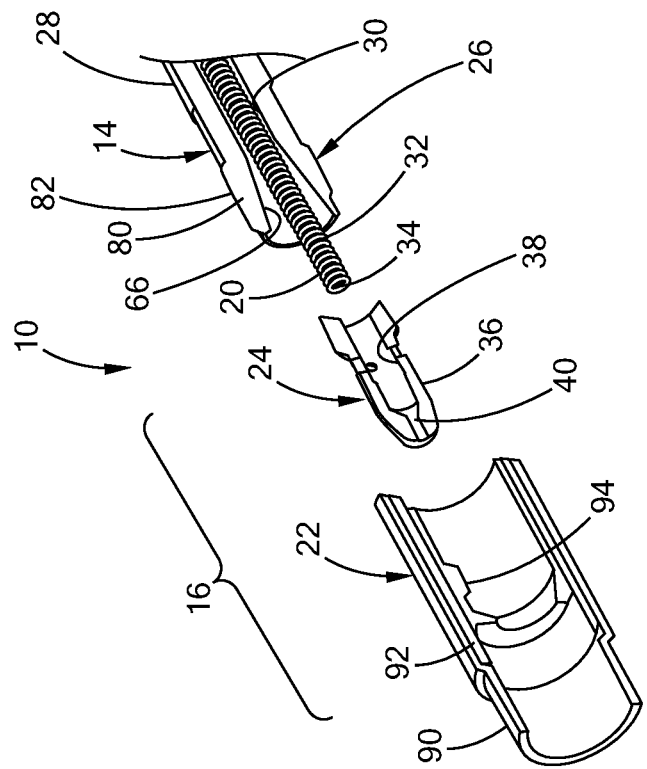
FIG. 4 is a partial exploded, cross-sectional view of a conductor tube and a consumable assembly constructed in accordance with a first embodiment of the present disclosure.
Figure 3:
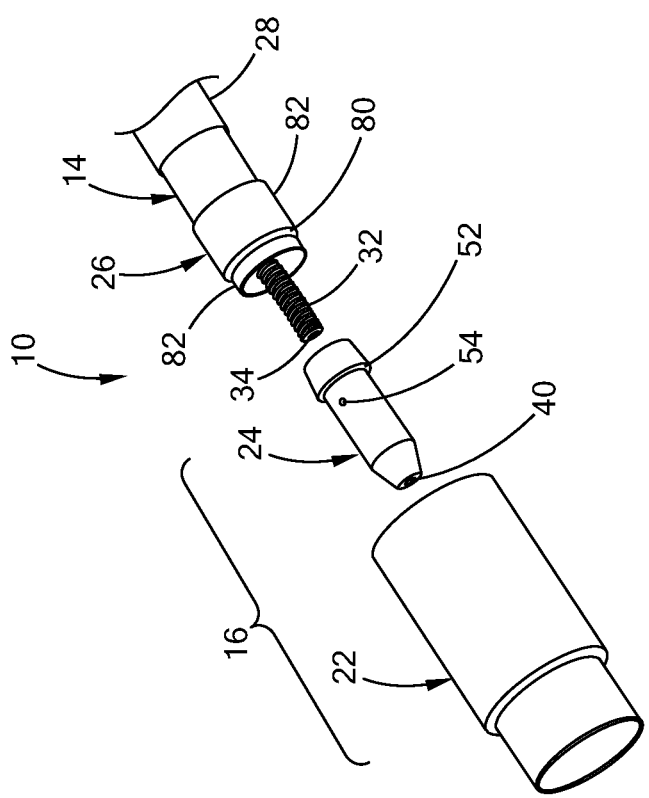
FIG. 3 is a partial exploded, perspective view of a conductor tube and a consumable assembly constructed in accordance with a first embodiment the present disclosure.

Referring to FIGS. 2 through 4, the consumable assembly 16 is connected to a distal end portion 26 of the conductor tube 14. The nozzle 22 is substantially cylindrical and receives the distal end portion 26 of the conductor tube 14 therein. The contact tip-diffuser 24 is coaxially disposed inside the nozzle 22 and has a portion inserted into the distal end portion 26 of the conductor tube 14. The conductor tube 14 includes a cylindrical conductor body 28 defining an internal passageway 30, and a conduit liner 32 disposed in the internal passageway 30. The conduit liner 32 has a guiding channel 34 for guiding the welding wire 20 from the welding cable 18 and the handle 12 to the contact tip-diffuser 24.

The nozzle 22 includes an outer body 90, an insulator 92 and an inner body 94, which are integrally formed as a single integrated unit. The insulator 92 is disposed between the outer body 90 and the inner body 94 for insulating the inner body 94 from the outer body 90. The nozzle 22 is disposed around the integrated tip-diffuser 24 and secured to the distal end portion 26 of the conductor tube 14. The distal end portion 26 of the conductor tube 14 defines an internal tapered surface 66, an external shoulder 80, and an outer contact surface 82 proximate the external shoulder.

The contact tip-diffuser 24 has an integrated structure and functions as both a contact tip for transferring electrical current and a gas diffuser for diffusing shielding gas. The contact tip-diffuser 24 includes a hollow cylindrical body 36 defining an internal cavity 38 and an exit orifice 40 open to and aligned with the internal cavity 38. The internal cavity 38 and the exit orifice 40 jointly extend the entire length of the contact tip-diffuser 24. The internal cavity 38 of the contact tip-diffuser 24 is aligned with the internal passageway 30 of the conductor tube 14 such that the conduit liner 32 of the conductor tube 14 can extend into the internal cavity 38 of the contact tip-diffuser 24. In one example, the cylindrical body 36 of the contact tip-diffuser 24 is made of a copper alloy, such as C18200, C181500 or C12200DHP and can be produced by machining or other large volume manufacturing processes such as cold forming, extruding or the combination of the two.

Figure 5:
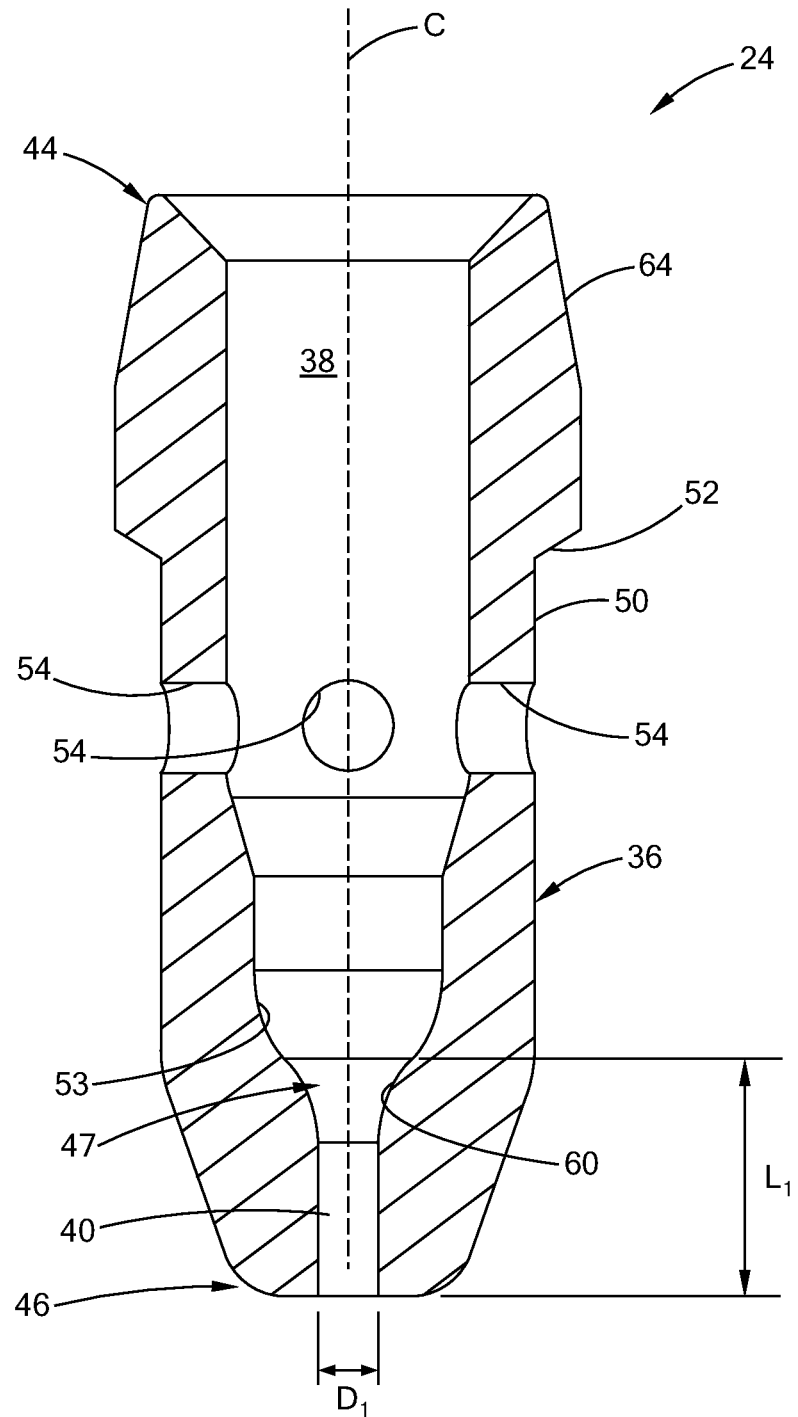
FIG. 5 is a cross-sectional view of a contact tip-diffuser constructed in accordance with a first embodiment of the present disclosure.

As clearly shown in FIG. 5, the contact tip-diffuser 24 includes the cylindrical body 36 defining a proximal end portion 44 proximate the conductor tube 14 and a distal end portion 46 proximate the workpieces. The internal cavity 38 extends from the proximal end portion 44 to the distal end portion 46 and is substantially cylindrical. The cylindrical body 36 further includes an outer wall 50, an outer shoulder 52 disposed at the proximal end portion 44, and an inner shoulder 53 disposed near the distal end portion 46 of the cylindrical body 36. The inner shoulder 53 is also disposed at a distal end 47 of the internal cavity 38 and provides a stop for the conduit liner 32 of the conductor tube 14.

A plurality of apertures 54 extend through the outer wall 50 of the cylindrical body 36 into the internal cavity 38 and are located between the proximal end portion 44 and the distal end portion 46. In the present embodiment, four apertures 54 (only three are shown) extend normally (e.g. perpendicularly) through the outer wall 50 of the cylindrical body 36 and are spaced at 90°. It is understood that any number of apertures can be formed through the outer wall 50 of the contact tip-diffuser 24 without departing from the scope of the present disclosure. During operation, the shielding gas is directed from the internal passageway 30 of the conductor tube 14 into the internal cavity 38 of the contact tip-diffuser 24. The shielding gas is then directed outside the contact tip-diffuser 24 through the plurality of apertures 54 to form a blanket of shielding gas surrounding the contact tip-diffuser 24 and between the contact tip-diffuser 24 and the nozzle 22. The blanket of shielding gas protects the molten metal pool during operation.

By directing the shielding gas from inside the contact tip-diffuser 24 to outside the contact tip-diffuser 24 and making the shielding gas in direct contact with the contact tip-diffuser, the contact tip-diffuser 24 can be more efficiently cooled by the shielding gas. Heat transfer from the contact tip-diffuser 24 to the shielding gas can be achieved via thermal conduction and convection, as opposed to thermal radiation or convection in the prior art arc welding apparatuses where the shielding gas does not flow through the contact tip. Moreover, according to the present disclosure, the shielding gas provides cooling both inside and outside the contact tip-diffuser 24 and thus can more quickly remove heat from the contact tip-diffuser 24.

The exit orifice 40 extends through the distal end portion 46 of the cylindrical body 36 and has a length L1, which is approximately four times the size (e.g., the diameter D1) of the opening of the exit orifice 40. In the present embodiment, the exit orifice 40 is centered along a centerline C of the cylindrical body 36. The exit orifice 40 defines a radiused inlet 60. The radiused inlet 60 reduces scraping and shaving of the welding wire 20 when the welding wire 20 moves through the exit orifice 40. The length L1 of the exit orifice 40 is made smaller than that of the exit orifice in a prior art contact tip to provide controlled contact between the welding wire 20 and the contact tip-diffuser 24 for improved arc stability and less chance of exit orifice obstruction. Moreover, the smaller length of the exit orifice 40 reduces friction surface between the welding wire 20 and the contact tip-diffuser 24.

An external contact surface 64 is disposed around the proximal end portion 44 of the cylindrical body 36 and defines a taper configured to abut a corresponding internal tapered surface 66 (shown in FIGS. 2 and 4) of the conductor tube 14, which will be described in more detail below. The external contact surface 64 is tapered outwardly from the proximal end portion 44 towards the distal end portion 46.

Figure 6:
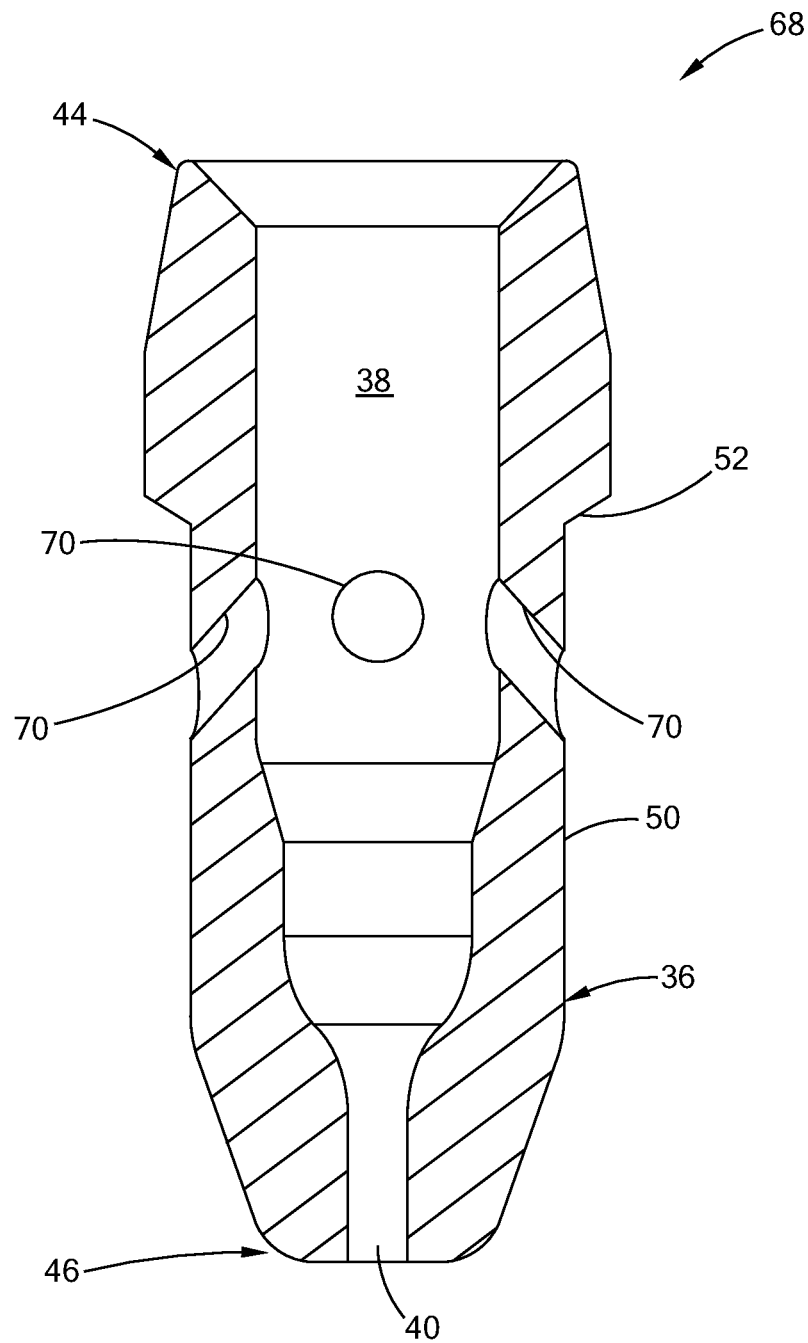
FIG. 6 is a cross-sectional view of a variant form of a contact tip-diffuser constructed in accordance with a first embodiment of the present disclosure.
Figure 7:
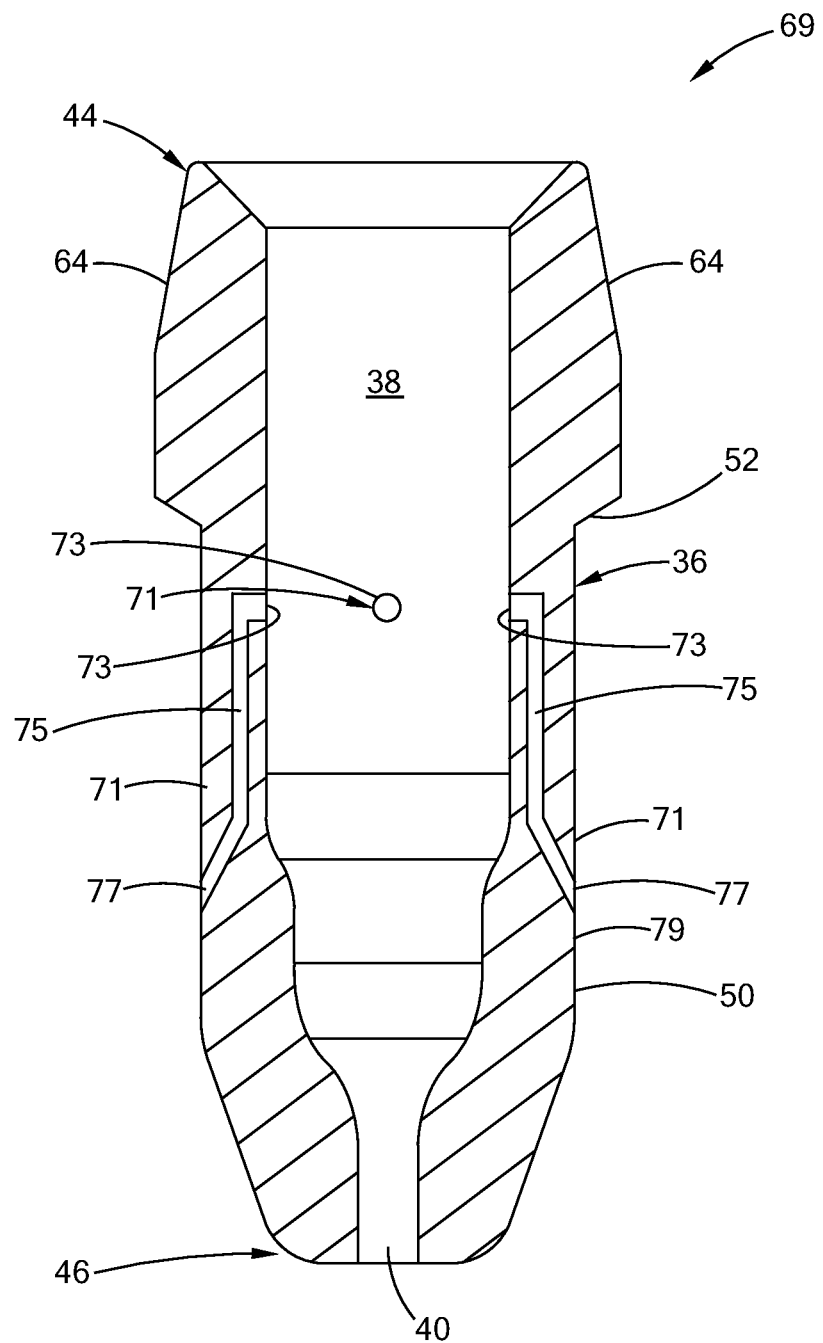
FIG. 7 is a cross-sectional view of another form of a contact tip-diffuser constructed in accordance with a first embodiment of the present disclosure.

FIGS. 6 to 13 refer to various embodiments of the contact tip diffuser similar to that of FIG. 3. Referring to FIGS. 6 and 7, another form of a contact tip-diffuser 68 is similar to that of FIG. 3 except for the orientation of the apertures. In the example of FIG. 6, a contact tip-diffuser 68 defines a plurality of apertures 70 extending at an angle through the outer wall 50 of the cylindrical body 36. In the example of FIG. 7, a contact tip-diffuser 69 has a plurality of apertures 71 each having an inlet 73, an axial passage 75, and an outlet 77. The axial passage 75 extends along a longitudinal direction of the contact tip-diffuser 69 and connects the inlet 73 open to the internal cavity 38 to the outlet 77 formed on an exterior portion 79 of the outer wall 50.

Figure 8:
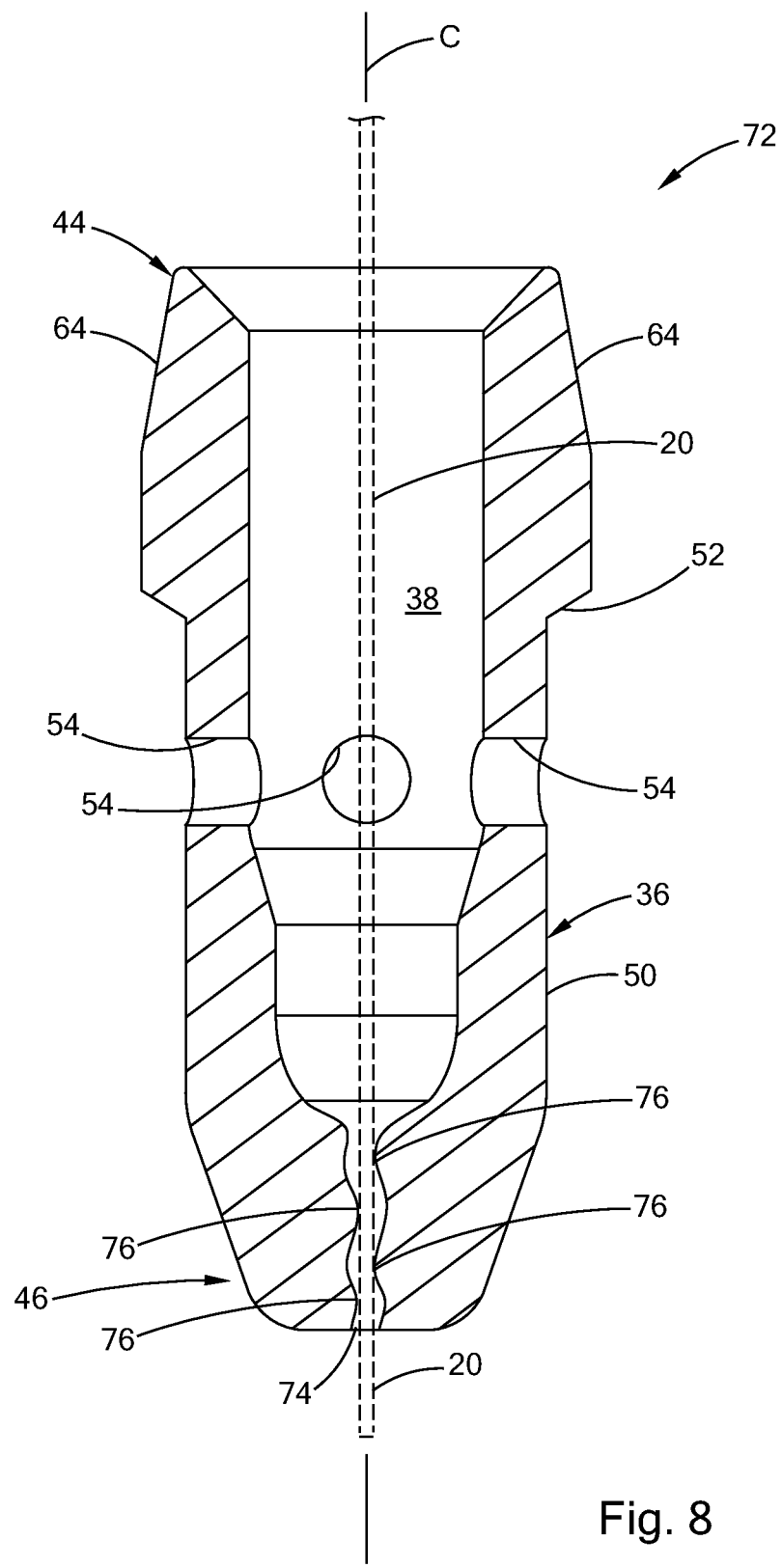
FIG. 8 is a cross-sectional view of another form of a contact tip-diffuser constructed in accordance with a first embodiment of the present disclosure.

Referring to FIG. 8, another form of a contact tip-diffuser 72 is similar to that of FIG. 3, except for the configuration of the exit orifice. The contact tip-diffuser 72 defines an exit orifice 74 that is offset from the centerline C of the cylindrical body 36. The exit orifice 74 generally defines a wave shape to create a plurality of contact points 76. The wave shape may be significantly sinusoidal or have increasing or decreasing wavelengths along the length of passage extending toward the exit orifice. When the welding wire 20 moves through the exit orifice 74, the welding wire 20 contacts the plurality of contact points 76, which improve contact between the welding wire 20 and the contact tip-diffuser 24, thereby providing stable current transfer from the contact tip-diffuser 24 to the welding wire 20.

Referring to FIGS. 9 through 12, other variations of contact tip-diffusers 84a to 84d are similar to that of FIG. 3 except for the plurality of apertures 54 are defined various forms and orientations of a plurality of slots 84e to 84h. As used herein, the term slot shall be construed to mean an aperture or opening defining a geometry having a length greater than or equal to a width in a substantially rectangular form.

Figure 9:
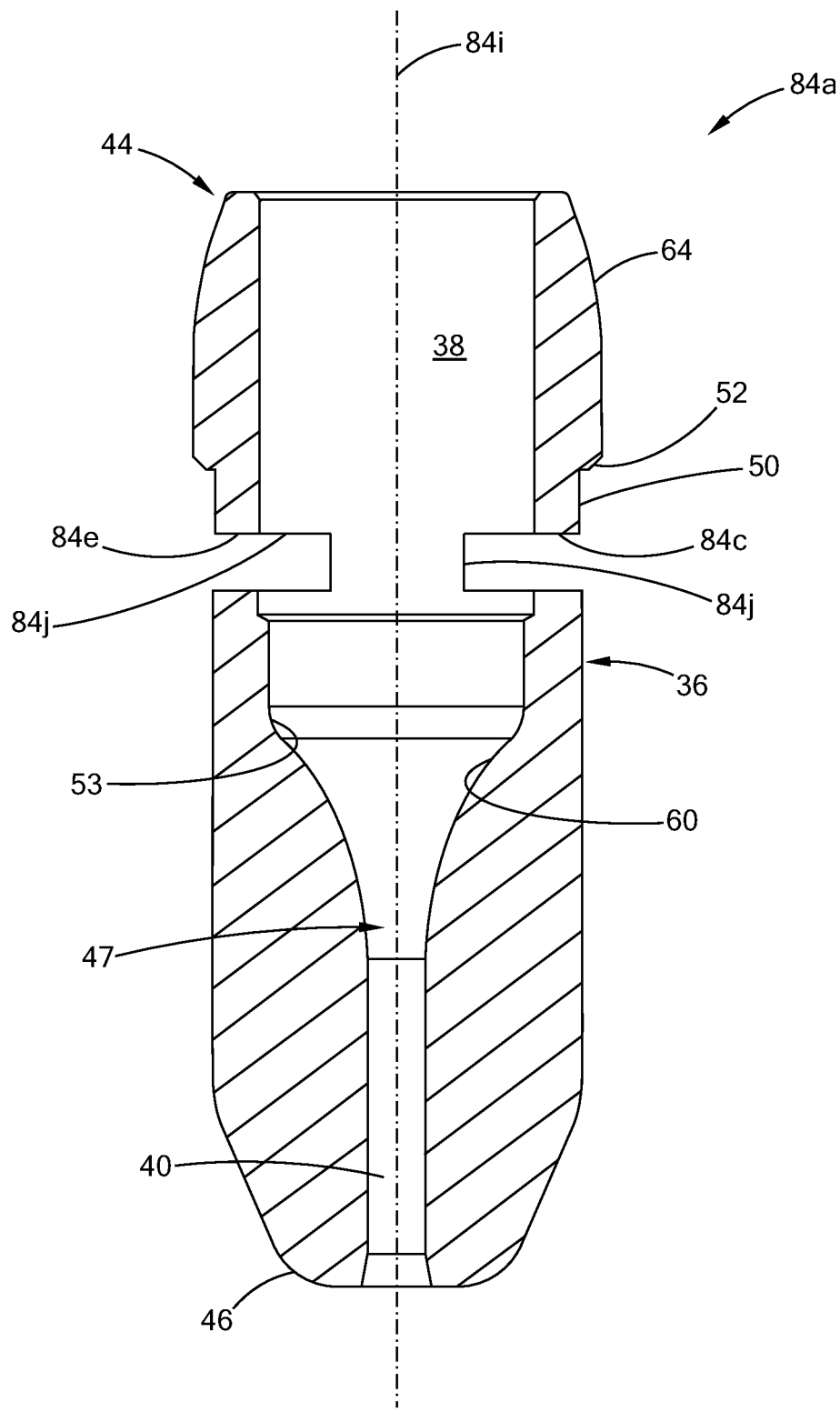
FIG. 9 is a cross-sectional view of another form of a contact tip-diffuser constructed in accordance with a first embodiment of the present disclosure.
Figure 10:
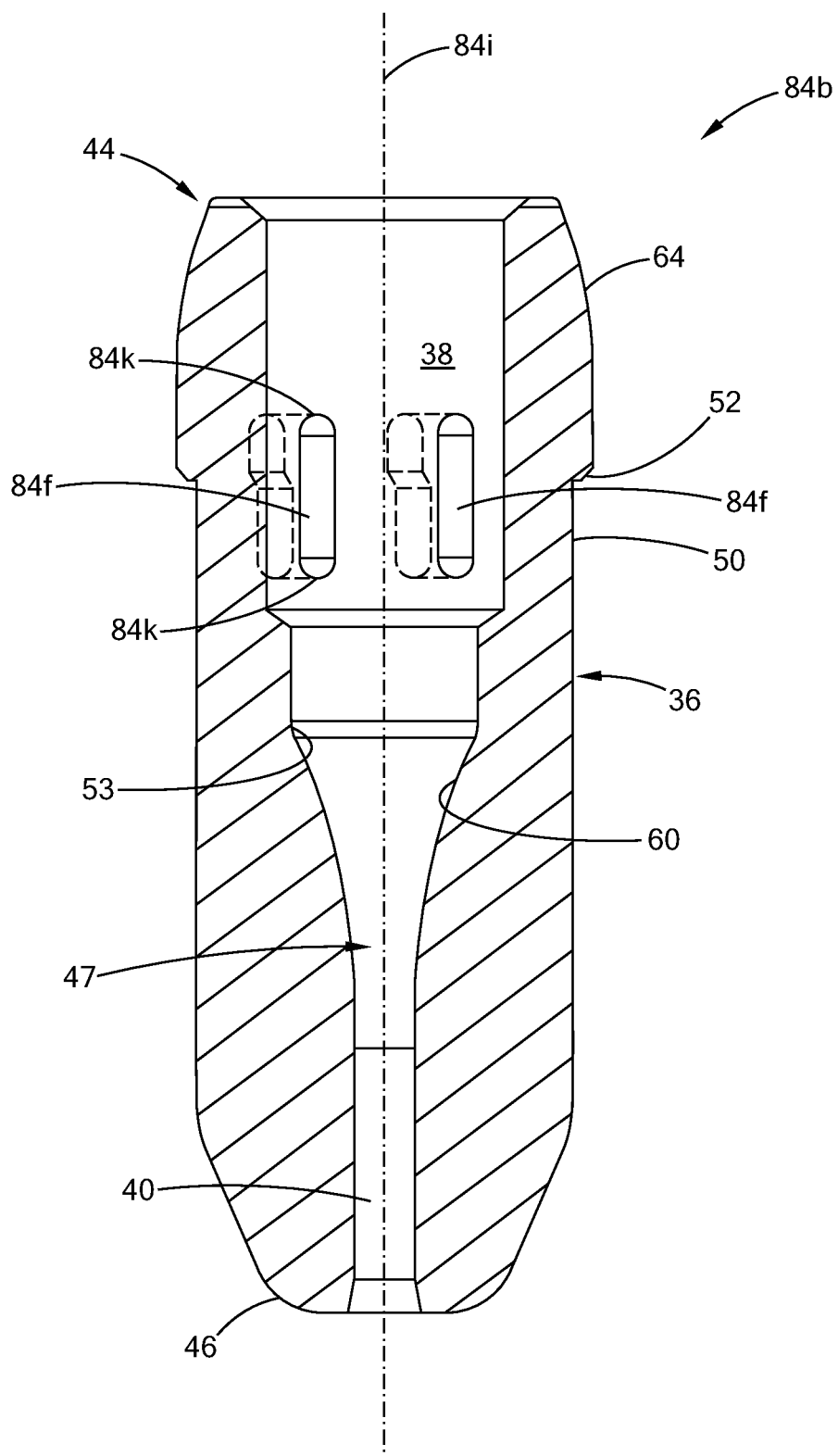
FIG. 10 is a cross-sectional view of another form of a contact tip-diffuser constructed in accordance with a first embodiment of the present disclosure.

In the example of FIG. 9, a contact tip-diffuser 84a defines a plurality of slots 84e, having a length and width, the length being longer than the width across a symmetric axis of the slot 84e. The plurality of slots further define the length of the each slot 84e extending at an angle perpendicular to the longitudinal axis 84i of the cylindrical body 36. The plurality of slots 84e may be defined as a plurality of polygonal openings 84j significantly square in shape that promote more consistent shielding gas flow and coverage. In the example of FIG. 10, a contact tip diffuser 84*b* has a plurality of slots 84*f*, the length of each slot extending parallel to the longitudinal axis 84*i*. Each slot may have a significantly rounded profile 84*k* about two ends. Further, in this example the slots are formed at an angle in relation to the outer wall 50 of the cylindrical body 36 causing the shielding gas to be directed rotationally in the nozzle 22. The angle in relation to the outer wall 50 is shown having an acute side extending axially; however the acute side may extend longitudinally or at an intermediate position between the radial and longitudinal axis.

Figure 11:
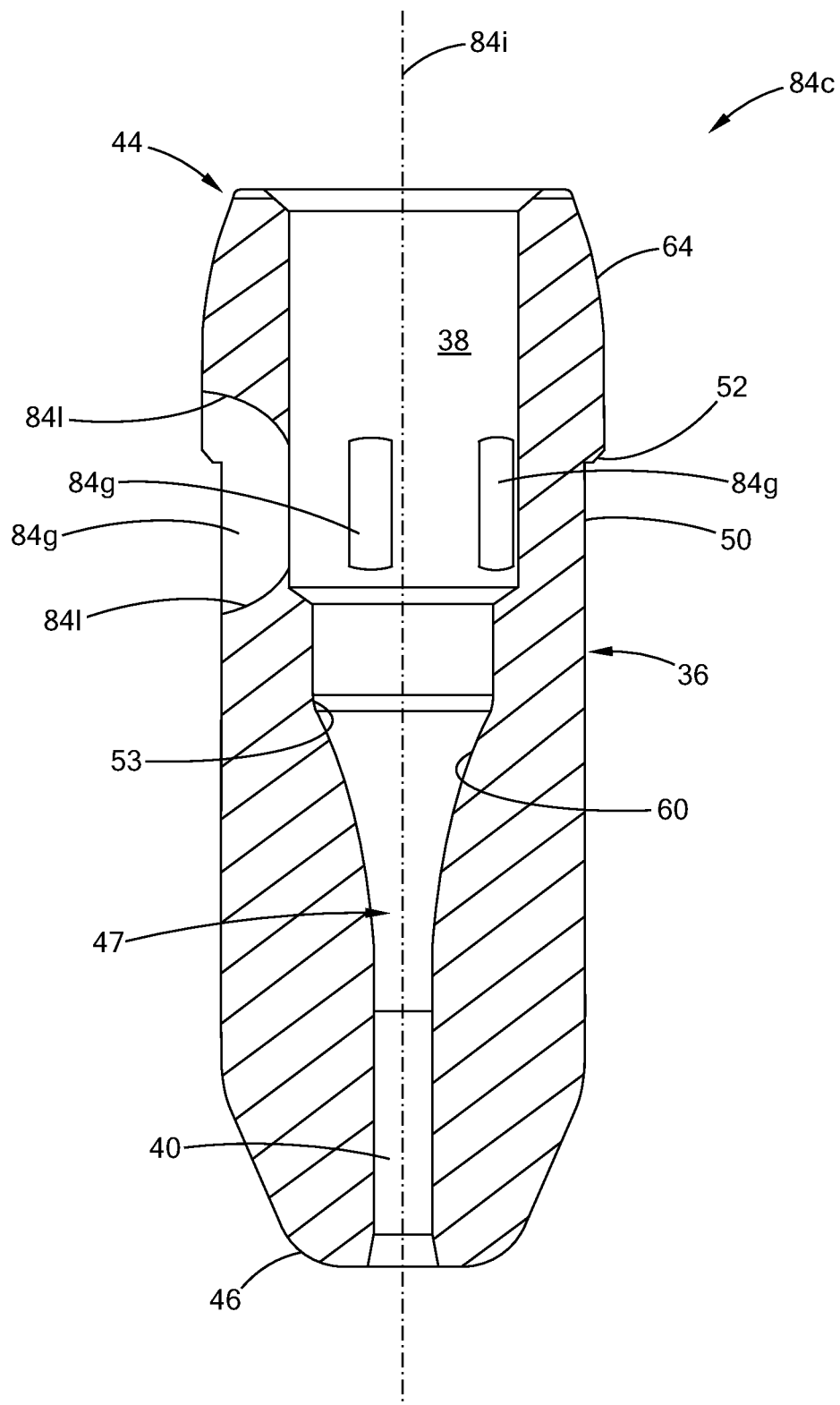
FIG. 11 is a cross-sectional view of another form of a contact tip-diffuser constructed in accordance with a first embodiment of the present disclosure.
Figure 12:
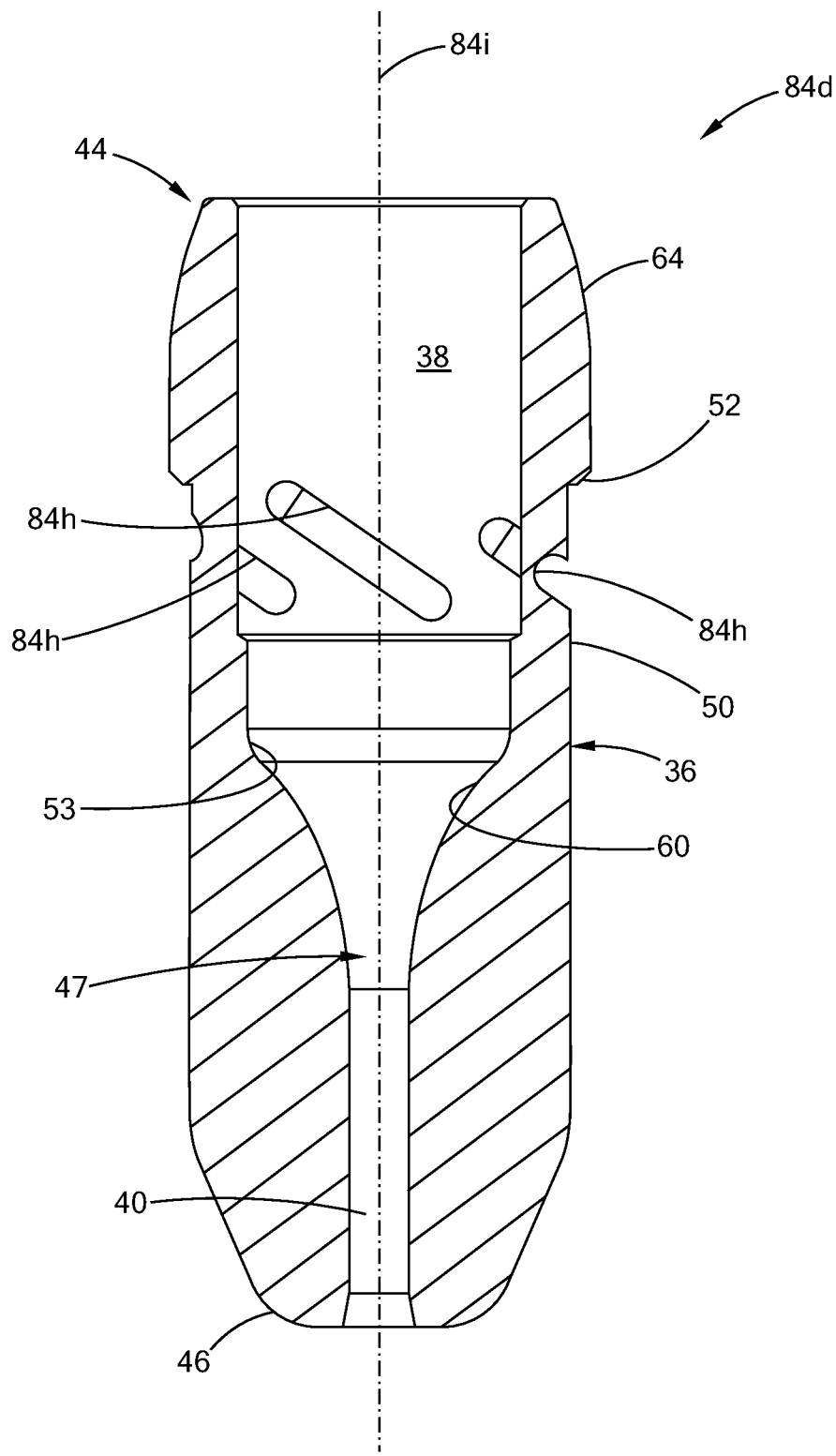
FIG. 12 is a cross-sectional view of another form of a contact tip-diffuser constructed in accordance with a first embodiment of the present disclosure.

Referring now to FIG. 11, a contact tip diffuser 84*c* is shown having plurality of slots 84*g* each having a length extending parallel to the longitudinal axis 84*i* and each slot is shown having a rounded internal passage wall 84*l*. The internal passage wall 84*l* of each slot may also comprise chamfers, fillets or other variations and combinations thereof to optimize the flow of the shielding gas. In FIG. 12 another example of a contact tip diffuser 84*d* has plurality of slots 84*h* each extending at an angle in relation to the longitudinal axis 84*i*.

Figure 13A:
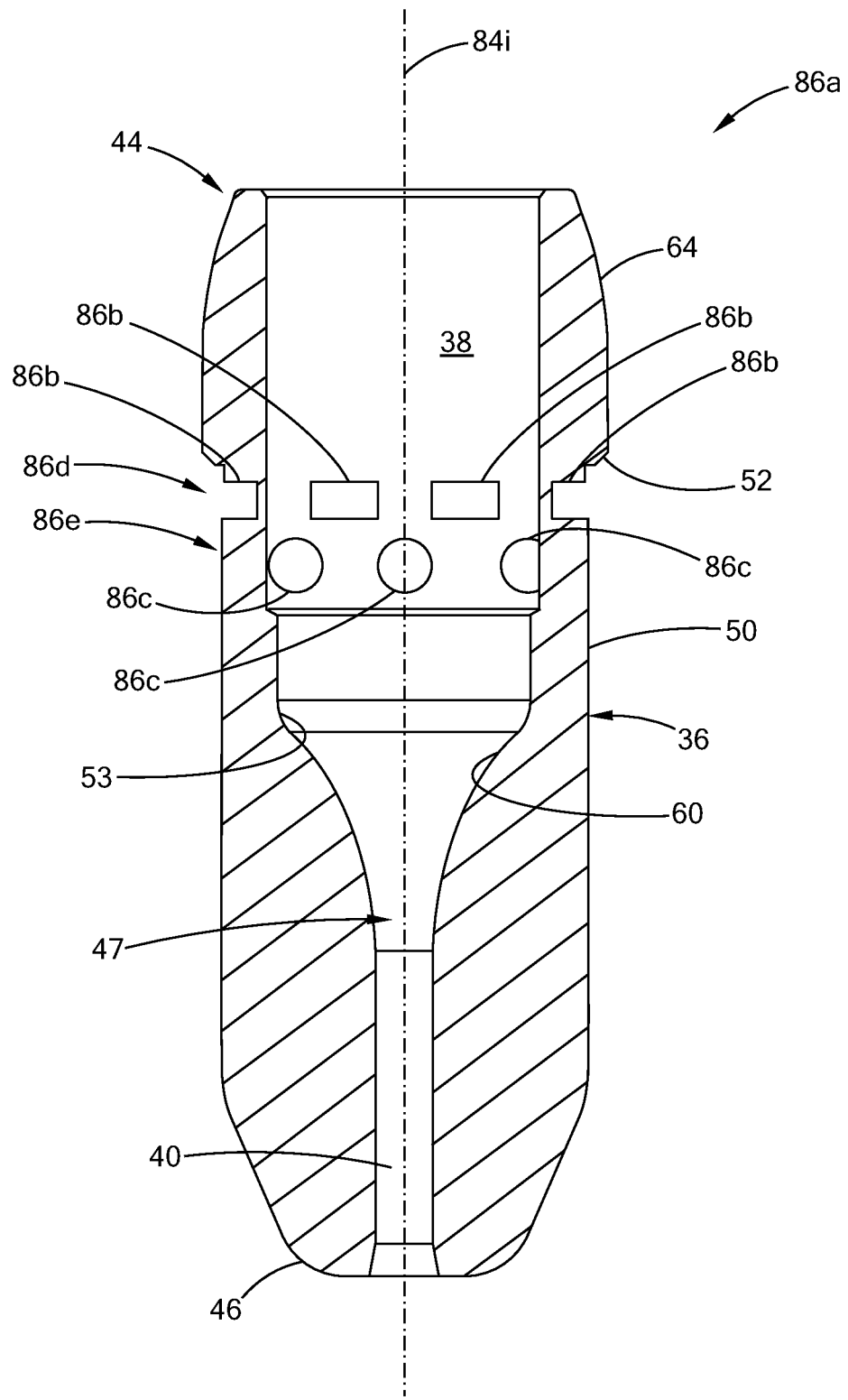
FIG. 13A is a cross-sectional view of another form of a contact tip-diffuser constructed in accordance with a first embodiment of the present disclosure.

In the example of FIG. 13A, a contact tip-diffuser 86*a* defines a plurality of slots 86*b* and a plurality of holes 86*c* extending through the outer wall 50 of the cylindrical body 36. In this example, the plurality of slots 86*b* is evenly spaced radially in relation to the longitudinal axis 84*i* and forms a row of slots 86*d*. Further the plurality of holes 86*c* is evenly spaced radially about the longitudinal axis and forms a row of holes 86*e*. Each hole 86*d* and each slot 86*c* also alternate about the outer wall 50 of the cylindrical body 36. This example of the contact tip diffuser further demonstrates the different implementations of the plurality of apertures 54 introduced in all of the previous figures.

Figure 13B:
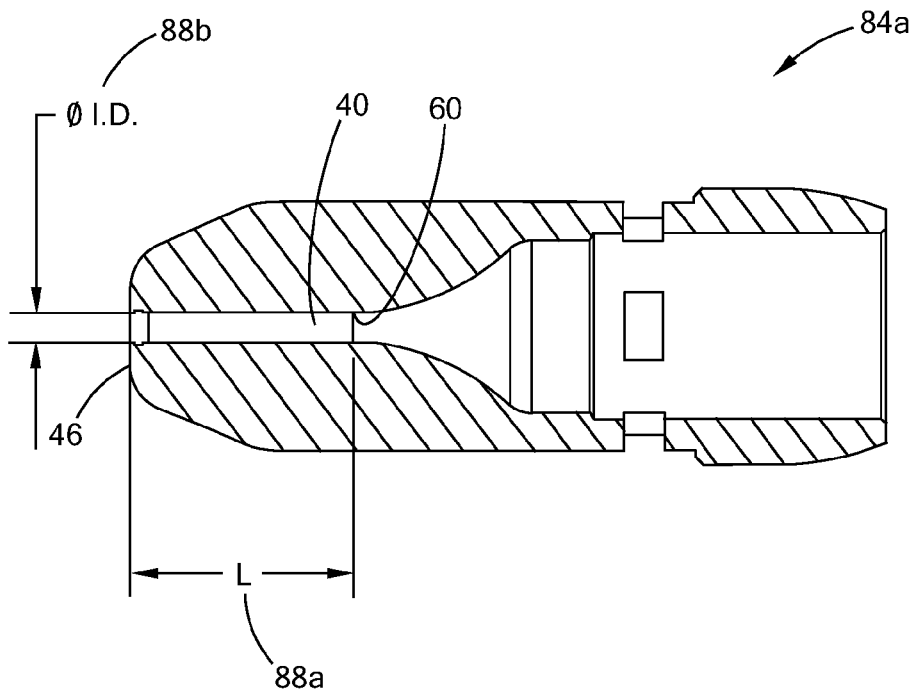
FIG. 13B is a cross-sectional view of a contact tip diffuser, and 13C is a curve representing the relationship between the tip bore length and the tip inside diameter.
Figure 13C:
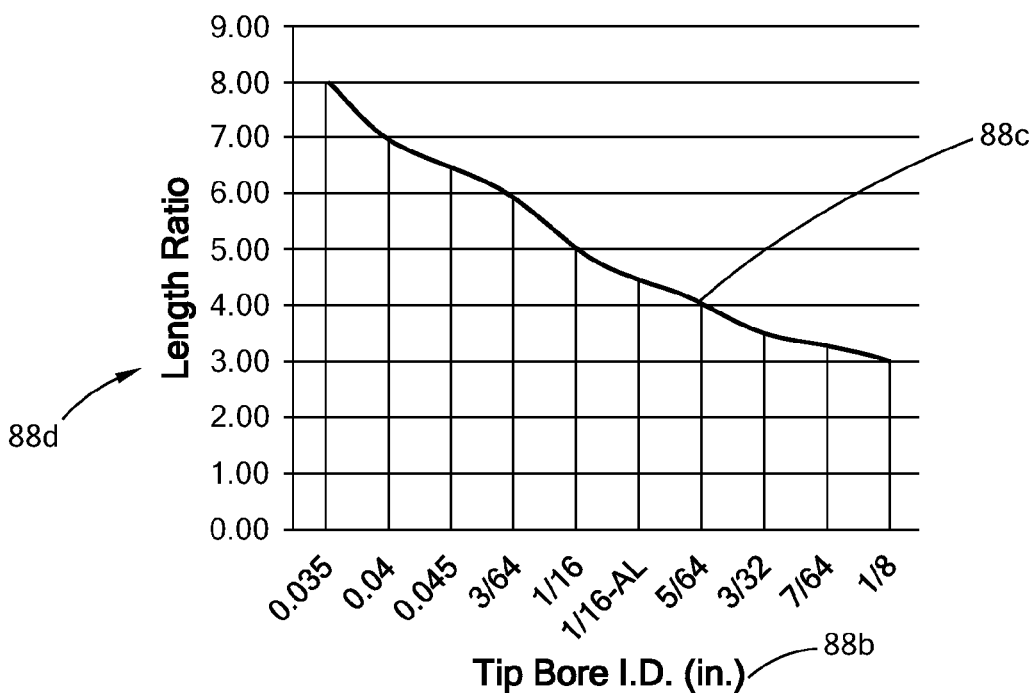

Referring to FIGS. 13B and 13C, FIG. 13B demonstrates a cross-sectional view of a contact tip diffuser, and FIG. 13C demonstrates a curve representing the relationship between the bore length 88*a* and the tip inside diameter (I.D.) 88*b* of the contact tip diffuser 84*a*. The bore length 88*a* represents the length of the contact tip diffuser 84*a* that contacts the welding wire extending from the distal end portion 46 to the radiused inlet 60. The tip inside diameter 88*b* represents the diameter of the cylindrical exit orifice 40. The curve 88*c* illustrates the ratio between the bore length 88*a* and the tip inside diameter 88*b* of the exit orifice 40 for the contact tip diffuser 84*a* and other contact tip diffuser contemplated by the disclosure.

The curve 88*c* demonstrates that for smaller welding wires and tip inside diameters 88*b*, the bore length ratio 88*d* may be higher. For example, when the tip inside diameter 88*b* is 7/64 in., the bore length ratio is between 3 and 4, but when the tip inside diameter 88*b* is 0.045, the bore length ratio 88*d* is between 6 and 7. In general, the bore length ratio 88*d* may be between 2 and 9 for contact tips having tip inside diameters between 1/8 in. and 0.035 in. respectively. FIG. 13C illustrates guidelines for implementing the contact tip diffusers disclosed and should not be considered limiting to the scope of the disclosure. The curve 88*c* demonstrates that the bore length ratio 88*d* increases as the tip inside diameter 88*b* decreases for contact tip diffusers.

The implementations of the contact tips shown are only exemplary and should not be considered limiting this disclosure. Other examples may include multiple rows comprising a plurality of slots, a plurality of holes or any combination thereof further comprising a plurality of gas outlet passages from the cavity 38. The gas outlet passages may be formed symmetrically or a-symmetrically in relation to one another and the individual placement of the each outlet passage about the body. The gas outlet passages may be formed in any pattern extending around the circumference of the body and may also comprise rows extending at angles radially about the body with respect to the longitudinal axis 84*i*.

In yet another implementation a row of holes and a row of slots may overlap or a plurality of slots may comprise individual slots each extending lengthwise at a different angles with respect to the longitudinal axis. Finally the gas outlet passages may comprise different shapes including but not limited to ellipses and polygons having a variety of chamfered or filleted sides or edges. Each of the previous examples demonstrates an implementation of gas outlet passages that direct shielding gas into the nozzle 22 and provide for improved cooling of the contact tip diffuser 24 while maintaining shielding gas coverage for improved contact tip life for implementations in accordance with this disclosure.

Figure 14:
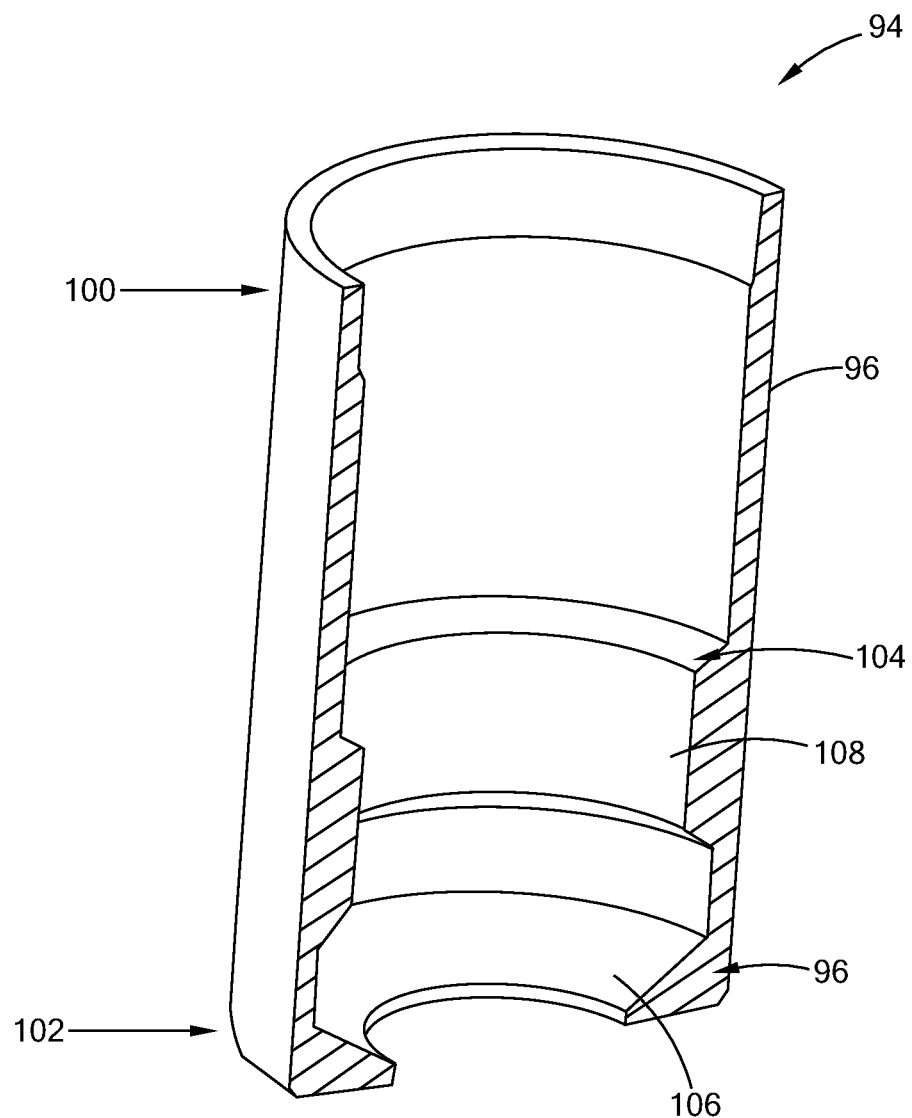
FIG. 14 is a cross-sectional, perspective view of an inner body of a nozzle constructed in accordance with a first embodiment of the present disclosure.

Referring to FIG. 14, the inner body 94 of the nozzle 22 is configured to function as a tip holder and secure the integrated tip-diffuser 24 therein. The inner body 94 includes a generally cylindrical hollow body 76 and includes a proximal end 100 and a distal end 102. The inner body 94 defines an internal distal flange 96 at the distal end portion 102, and an intermediate flange 104 between the proximal end portion 100 and the distal end portion 102. The internal distal flange 96 defines a peripheral angled surface 106 for contacting the external shoulder 52 of the contact tip-diffuser 24. The intermediate flange 104 defines an inner peripheral contact surface 108. The internal distal flange 96 abuts the external shoulder 52 of the contact tip-diffuser 24 to secure and position the integrated tip-diffuser 24.

Figure 15:
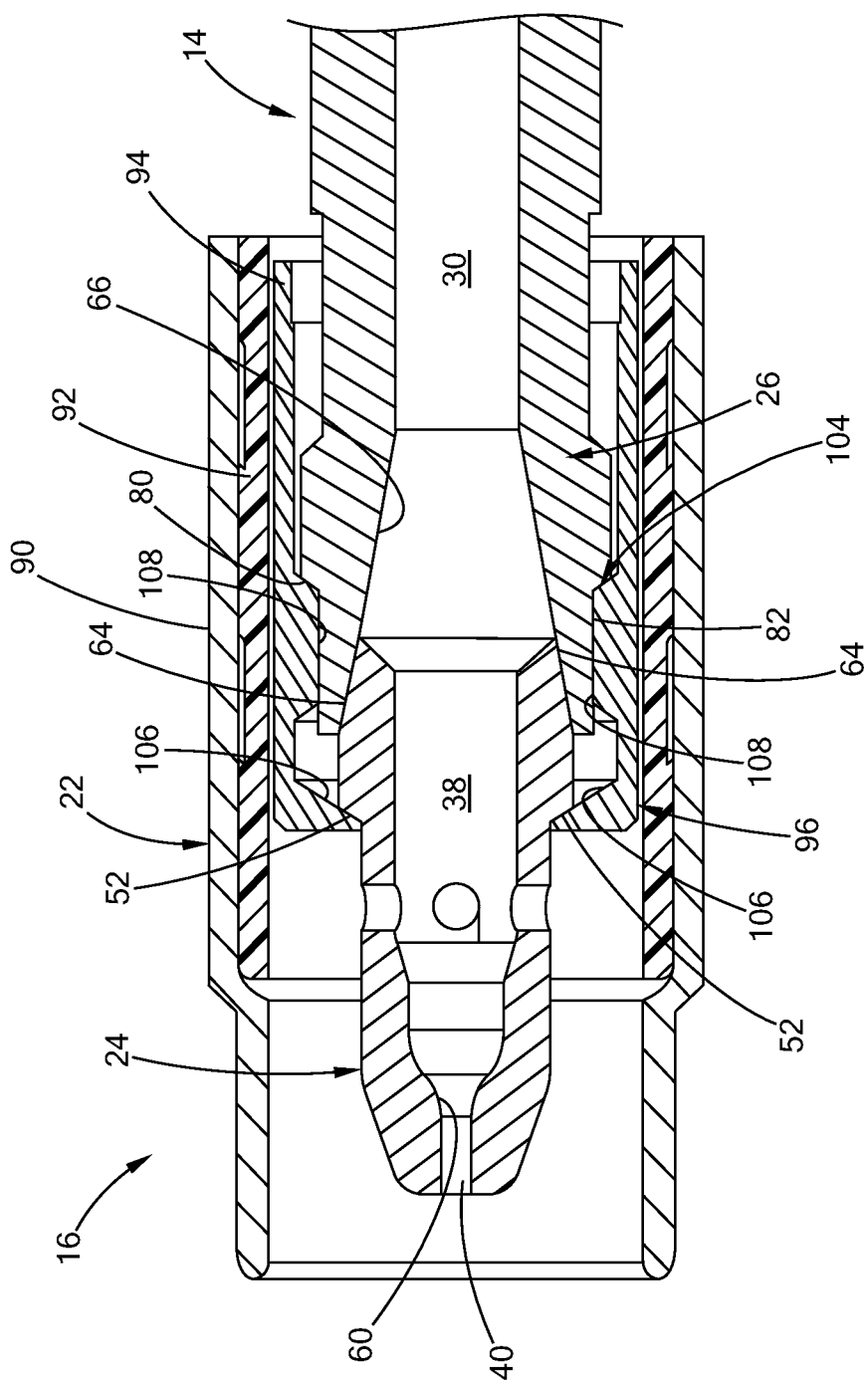
FIG. 15 is a cross-sectional view of a consumable assembly and a conductor tube of the arc welding apparatus constructed in accordance with a first embodiment of the present disclosure.

Referring to FIG. 15, when the conductor tube 14 and the contact tip-diffuser 24 are inserted into the nozzle 22, the inner peripheral contact surface 108 of the inner body 94 contacts the outer contact surface 82 of the conductor tube 14 and the external shoulder 80 of the conductor tube 14 engages the intermediate flange 104 of the inner body 94. The angled surface 106 of the internal distal flange 96 of the inner body 94 contacts the outer shoulder 52 of the contact tip-diffuser 24 and prevents the contact tip-diffuser 24 from moving distally as indicated by arrow X. The contact tip-diffuser 24 is prevented from moving proximally as indicated by arrow Y by the internal tapered surface 66 of the conductor tube 14. The external contact surface 64 of the contact tip-diffuser 24 is configured to match the internal tapered surface 66 of the conductor tube 14 such that when the proximal end portion 44 of the contact tip-diffuser 24 is secured to the distal end portion 26 of the conductor tube 14, the external contact surface 64 of the contact tip-diffuser 24 is in close contact with the internal tapered surface 66 of the conductor tube 14.

Sufficient physical contact is provided between the external contact surface 64 of the tip-diffuser 24 and the internal tapered surface 66 of the conductor tube 14 such that electrical current can be reliably transferred from the conductor tube 14 to the contact tip-diffuser 24 and heat can be efficiently transferred from the contact tip-diffuser 24 to the conductor tube 14. In addition to being cooled by the shielding gas, the contact tip-diffuser 24 can be further cooled due to the increased contact area between the contact tip-diffuser 24 and the conductor tube 14. The increased contact area allows efficient heat transfer from the contact tip-diffuser 24 to the conductor tube 14, as opposed to threaded contact surfaces between the contact tip and the diffuser in a prior art welding gun.

Referring back to FIGS. 3 and 4, to assemble the MIG welding gun, the outer body 90, the insulator 92 and the inner body 94 are pre-assembled to form an integrated nozzle 22 and the contact tip-diffuser 24 is inserted into the nozzle 22 from the proximal end of the nozzle 22 until the external shoulder 52 of the contact tip-diffuser 24 contacts the angled surface 106 of the internal distal flange 96 of the inner body 94. The internal distal flange 96 prevents the contact tip-diffuser 24 from further moving distally.

Next, the distal end portion 26 of the conductor tube 14 is inserted into the proximal end of the nozzle 22 until the distal end portion 26 of the conductor tube 14 is inserted into the space between the external contact surface 64 of the contact tip-diffuser 24 and the inner peripheral contact surface 108 of the inner body 94. No tool is required to connect the conductor tube 14 to the consumable assembly 16 that includes the nozzle 22 and the contact tip-diffuser 24. No threaded connection is needed for secured connection. The contact tip-diffuser 24, the nozzle 22 and the conductor tube 14 can be assembled by simply pressing these components toward one another. Accordingly, manufacturing costs can be reduced.

While not shown in these drawings, the conductor tube 14 can be secured to the inner body 94 of the nozzle 22 through threaded connection as illustrated in other embodiments.

Referring to FIG. 15, in operation, a shielding gas is directed from the internal passageway 30 of the conductor tube 14 and enters the internal cavity 38 of the contact tip-diffuser 24. The shielding gas is then directed outside the contact tip-diffuser 24 through the plurality of apertures 54. The apertures 54 diffuse the shielding gas and provide cooling to the integrated tip-diffuser 24.

A welding wire 20 is directed from the conductor tube 14, through the internal cavity 38 of the contact tip-diffuser 24 to the exit orifice 40 of the contact tip-diffuser 24. Electrical current is transferred from the conductor tube 14, through the contact tip-diffuser 24, to the welding wire 20. The radiused inlet 60 of the exit orifice 40 reduces scraping and shaving of the welding wire. The exit orifice 40 provides contact for the welding wire 20. The nozzle 22, which is disposed around the contact tip-diffuser 24, protects the contact tip-diffuser 22 from contacting the workpiece, which is grounded and also channels the shielding gas to the welding puddle.

The contact tip-diffuser 24 with the integrated structure can be sufficiently cooled due to increased contact surfaces between the contact tip-diffuser 24 and the conductor tube 14 and due to thermal conduction from the contact tip-diffuser 24 to the shielding gas. Also, the shielding gas provides cooling both inside and outside the contact tip-diffuser 24. With sufficient cooling, the contact tip-diffuser 24 can be formed of a hollow structure using less copper alloy to reduce manufacturing costs and can be used for heavy-duty applications (e.g., high amperage operation).

Moreover, the contact tip-diffuser 24 with the hollow and integrated structure is relatively easy to manufacture. The contact tip-diffuser 24 can be formed by a forming process, including but not limited to, forging, swaging, cold forming, extruding, metal injection molding (MIM), casting, and machining. The integrated contact tip-diffuser 24 which functions as both a contact tip for transferring electrical current and a diffuser for diffusing a shielding gas reduces total manufacturing costs by eliminating a separate component for a gas diffuser.

Figure 16:
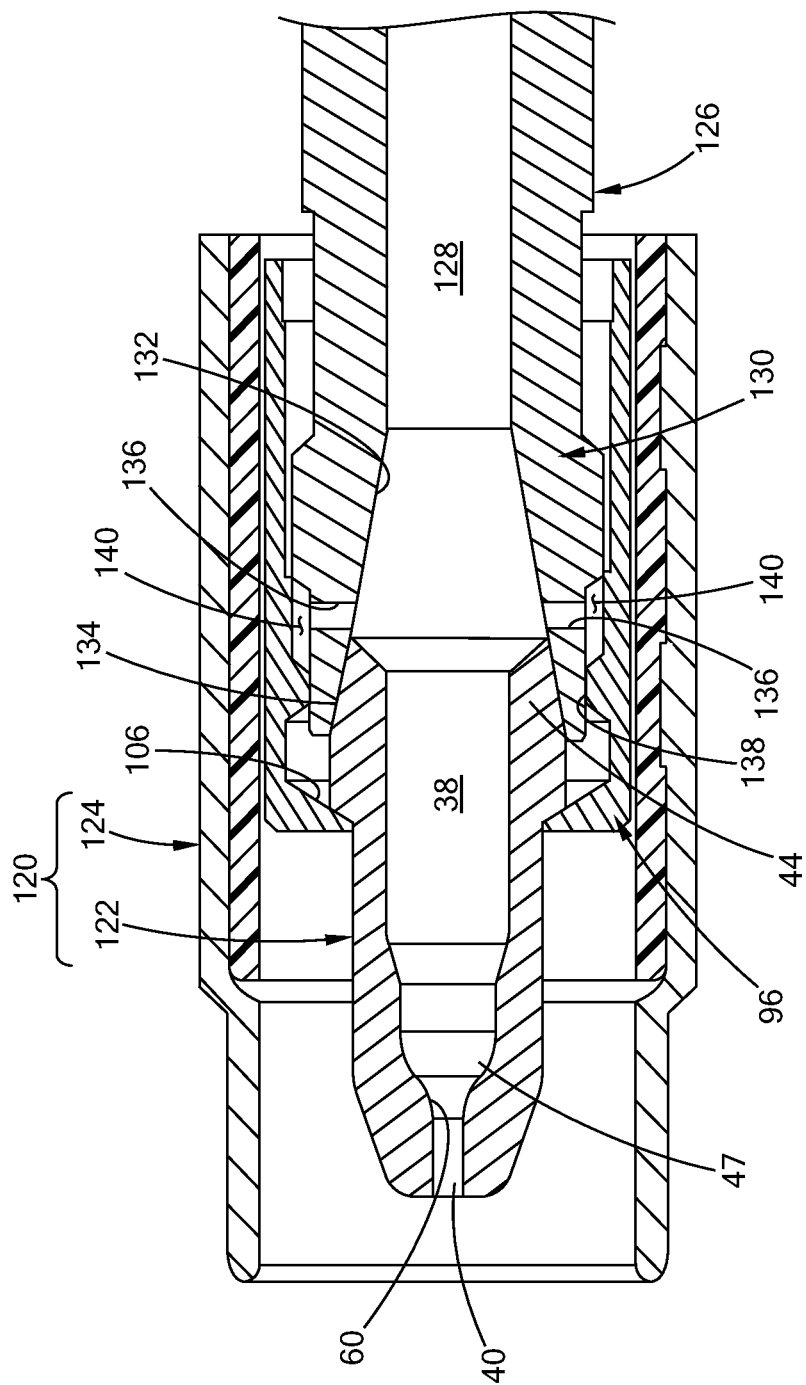
FIG. 16 is a cross-sectional view of a consumable assembly and a conductor tube of an arc welding apparatus constructed in accordance with a second embodiment of the present disclosure.

Referring to FIG. 16, a consumable assembly 120 and a conductor tube 126 for use in the arc welding apparatus 10 and constructed in accordance with a second embodiment of the present disclosure are shown. The consumable assembly 120 includes a contact tip 122 and a nozzle 124. The contact tip 120 in the present embodiment has a structure similar to that of the contact tip-diffuser 24 of FIG. 15, except that the contact tip 120 of FIG. 16 does not have any aperture extending through the outer wall 50 of the contact tip 120 to diffuse gas. Instead, the apertures for diffusing shielding gas are formed in the conductor tube 126.

Similarly, the contact tip 120 includes an internal cavity 38 and an exit orifice 40. A radiused inlet 60 is formed at a distal end 47 of the internal cavity 38. The internal cavity 38 is aligned with an internal passageway 128 of the conductor tube 126 to receive a conduit liner 32 (shown in FIG. 2). The structure of the contact tip 120 is similar to that the contact tip-diffuser 24 of FIG. 15 and the description thereof should be considered similar hereinafter to avoid redundancy.

The conductor tube 126 includes a distal end portion 130 having an internal tapered surface 132 for contacting an external contact surface 134 of the contact tip 122. The internal tapered surface 132 and the external contact surface 134 improve electric current transfer and heat transfer between the conductor tube 126 and the contact tip 122. The connection among the contact tip 122, the conductor tube 128 and the nozzle 124 is similar to the connection among the contact tip-diffuser 24, the conductor tube 14 and the nozzle 12 of FIG. 15 and thus the detailed description thereof should be considered similar hereinafter to avoid redundancy.

The distal end portion 130 of the conductor tube 126 defines a plurality of apertures 136 extending through the cylindrical wall 138 of the distal end portion 130. While the plurality of apertures 136 are shown to be oriented in a radial direction of the conductor tube 126, the apertures 136 may be oriented at an angle relative to the longitudinal axis of the conductor tube 126 or has a portion parallel to the longitudinal axis of the conductor tube 126. The plurality of apertures 136 are in fluid communication with the internal passageway 128 of the conductor tube 126. The plurality of apertures 136 are provides proximally from the proximal end portion 44 of the contact tip 122.

The contact tip 122, a nozzle 124 and the conductor tube 126 are suitable for light-duty application (approximately 250 A and below) by forming the apertures 136 in the conductor tube 126. When the shielding gas is directed from a gas source, through the welding cable 18 (shown in FIG. 1), and to the distal end portion 130 of the conductor tube 126, the shielding gas can be further directed outside the conductor tube 126 and into a first gas chamber 140 between the nozzle 124 and the distal end portion 130 of the conductor tube 126. The first gas chamber 140 is in fluid communication with a second gas chamber 142 between the contact tip 122 and the nozzle 124. The shielding gas may be further directed distally to the second gas chamber 142 through vent holes (not shown) formed in the internal distal flange 96 of the nozzle 124 or through gaps (not shown) between the internal distal flange 96 and the contact tip 122. A blanket of shielding gas is thus formed around the contact tip 122 to protect the molten metal pool.

The plurality of apertures 136 may be formed proximate the interface between the conductor tube 126 and the contact tip 122. Therefore, the shielding gas flowing through the apertures 136 may provide sufficient cooling to the contact tip 122 that is subjected to high heat during operation.

Like the contact tip-diffuser 24 of the first embodiment, the contact tip 122 is directly secured to the distal end portion 130 of the conductor tube 126 without any intervening component. In addition to transferring gas and electric current to the contact tip 122, the conductor tube 126 also functions to diffuse shielding gas to form a blanket of shielding gas around the contact tip 122. No separate gas diffuser is needed. Accordingly, the arc welding apparatus 10 that includes the consumable assembly 120 and the conductor tube 126 constructed in accordance with the teachings of the present disclosure has fewer components and thus the manufacturing costs are reduced.

While not shown in the drawings, it is understood that the apertures can be formed in both the conductor tube 126 and the contact tip 122 such that both conductor tube 126 and the contact tip 122 can diffuse the shielding gas. When the apertures are formed in both the conductor tube 126 and the contact tip 122, the consumable assembly and the conductor tube are suitable for heavy-duty applications.

Figure 17:
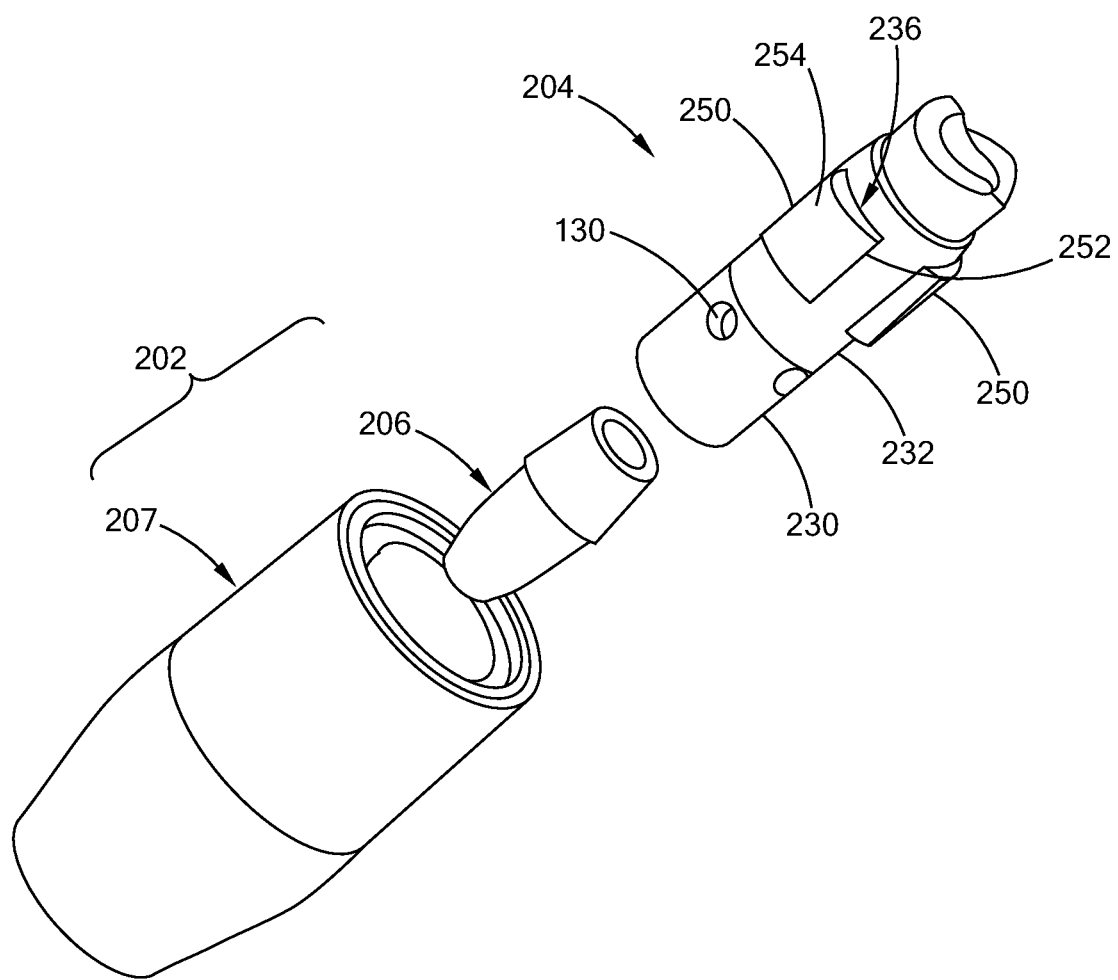
FIG. 17 is a partial exploded view of a consumable assembly and a conductor tube of an arc welding apparatus constructed in accordance with a third embodiment of the present disclosure.
Figure 18:
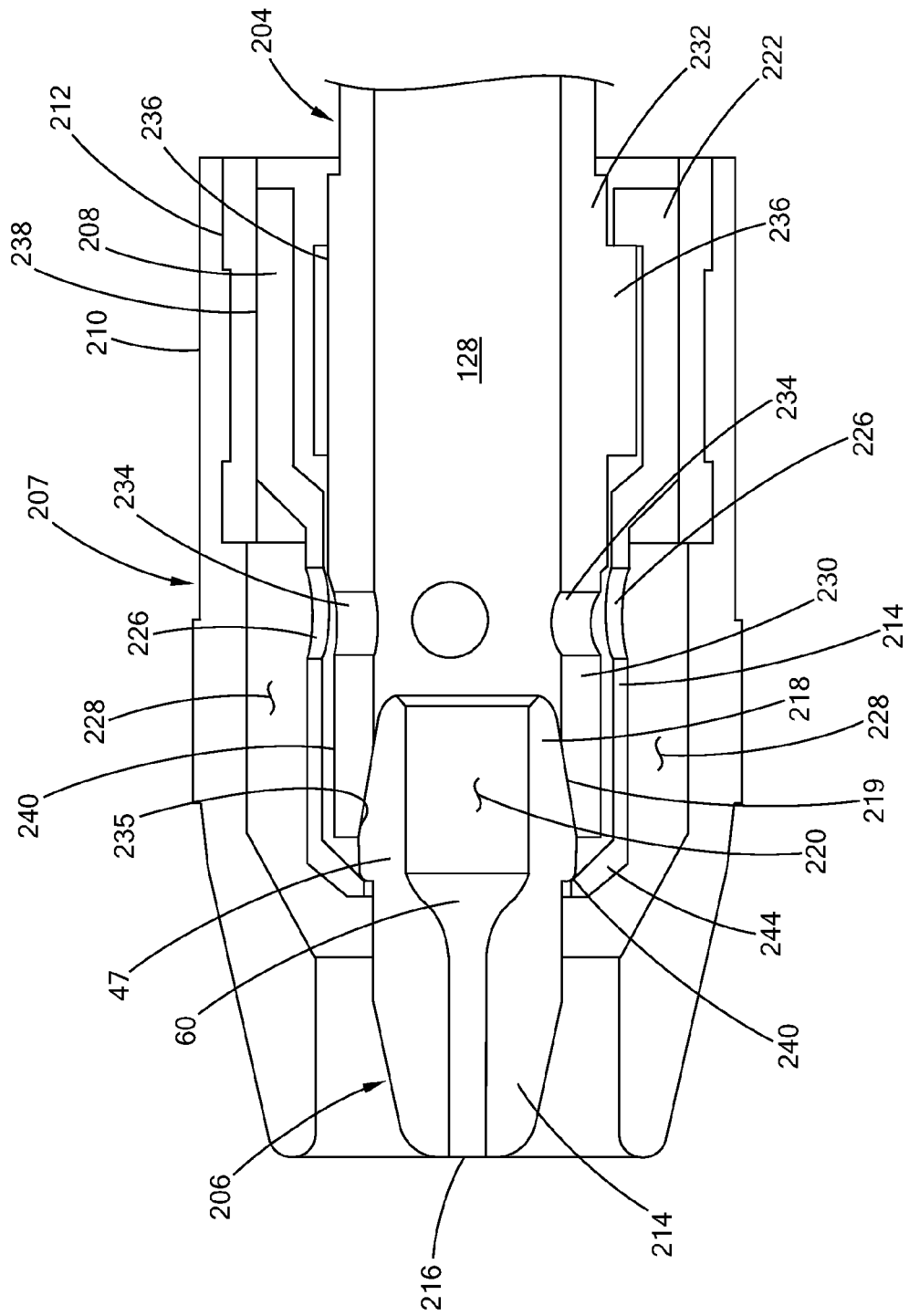
FIG. 18 is a cross-sectional view of a consumable assembly and a conductor tube of an arc welding apparatus constructed in accordance with a third embodiment of the present disclosure.

Referring to FIGS. 17 and 18, a consumable assembly 202 and a conductor tube 204 for use in the arc welding apparatus 10 and constructed in accordance with a third embodiment of the present disclosure is shown. The consumable assembly 202 includes a contact tip 206 and a nozzle 207 surrounding the contact tip 206. As in the second embodiment shown in FIG. 16, apertures 130 for directing shielding gas are formed in the conductor tube 204.

As clearly shown in FIG. 18, the contact tip 206 is a stub tip and has a distal end portion 214 defining an elongated exit orifice 216 and a proximal end portion 218 defining an internal cavity 220. The elongated exit orifice 216 has a length close to the length of the internal cavity 220, as opposed to the contact tip-diffuser and the contact tip in the first and second embodiments, where the elongated exit orifice is much shorter than the internal cavity. Similar to the contact tip-diffusers 24, 68, 69, 72 of the first embodiment and the contact tip 122 of the second embodiment, the contact tip 206 of the present embodiment has an external shoulder 240 and a tapered contact surface 219 at the proximal end portion 218.

The nozzle 207 includes an inner body 208, an outer body 210 surrounding the inner body 208, and an insulator 212 disposed therebetween. The inner body 208 of the nozzle 207 includes an enlarged proximal portion 222 and a narrowed distal portion 214. The insulator 212 is disposed between the outer body 210 and the enlarged proximal portion 222 of the inner body 208. The narrowed distal portion 214 includes an internal distal flange 244 for engaging the external shoulder 240 of the contact tip 206 and a plurality of apertures 226 for diffusing shielding gas. While two apertures 226 are shown in FIGS. 17 and 18, any number (including one) of apertures 226 can be formed in the inner body 224. A gas chamber 228 is defined between the narrowed distal portion 214 of the inner body 208 and the outer body 210 and is in fluid communication with the apertures 226 of the inner body 208.

The conductor tube 204 includes a distal portion 230 and an engaging portion 232 disposed proximally of the distal portion 230. The distal portion 230 defines a plurality of apertures 234 in fluid communication with the apertures 226 of the inner body 208. The distal portion 230 further defines an internal tapered surface 235 for contacting the external tapered surface 219 of the contact tip 206. The engaging portion 232 may includes a plurality of cam lock connection parts 236 for securing the conductor tube 204 in the nozzle 202. For example, three cam lock connection parts 236 may be provided along the circumference of the engaging portion 232 at 120° apart. The cam lock connection parts 236 each having opposing ends 250, 252 along the circumference of the conductor tube 204. One end 250 has a first thickness greater than a second thickness of the other end 252 such that a tapered surface 254 is formed between the opposing ends 250, 252. The cam lock connection parts 236 allow the conductor tube 204 to be secured inside the nozzle 207 in a sliding manner.

While not shown in the drawings, it is understood that the engaging portion 232 may be provided with threads for threaded connection with the inner body 208 of the nozzle 208 threaded connection as illustrated in other embodiments.

When the conductor tube 204 is inserted into the nozzle 207, the cam lock connection parts 236 engage an inner surface 238 of the enlarged proximal portion 222 of the inner body 208. Moreover, the distal portion 230 of the conductor tube 204 engages the inner surface 240 of the narrowed distal portion 224. When the conductor tube 204 is positioned in place, the apertures 230 of the conductor tube are aligned radially with the apertures 226 of the inner body 208 and the outer tapered surface 219 is in close contact with the internal tapered contact surface 235 of the conductor tube 204. The internal and external tapered contact surfaces 219 and 235 improve heat transfer from the contact tip 206 to the conductor tube 204, thereby providing more efficient cooling to the contact tip 206. By forming the apertures in the conductor tube 204, the consumable assembly 202 and the conductor tube 204 are suitable for light-duty applications.

Figure 19A:
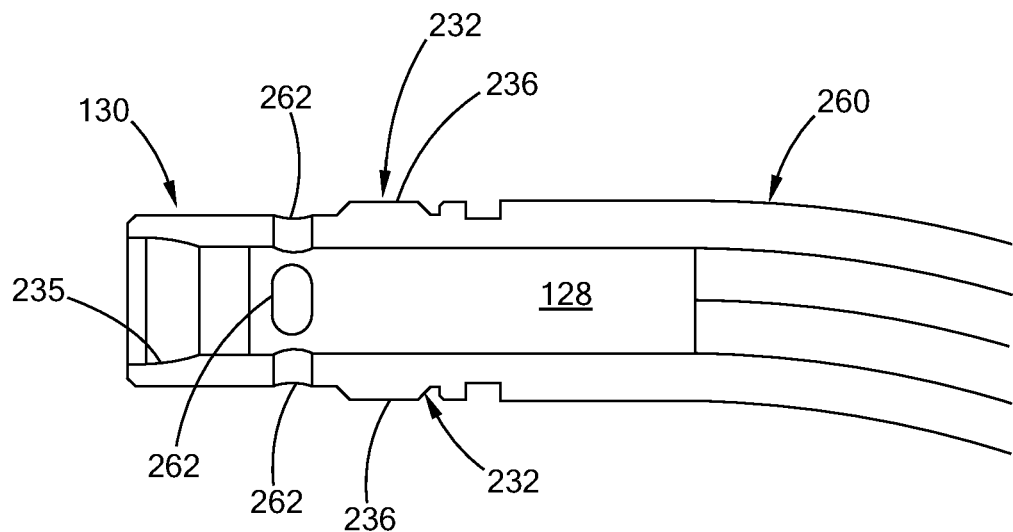
FIG. 19A is a profile and cross-sectional view of the conductor tube of an arc welding apparatus constructed in accordance with an embodiment of the present disclosure.
Figure 19B:
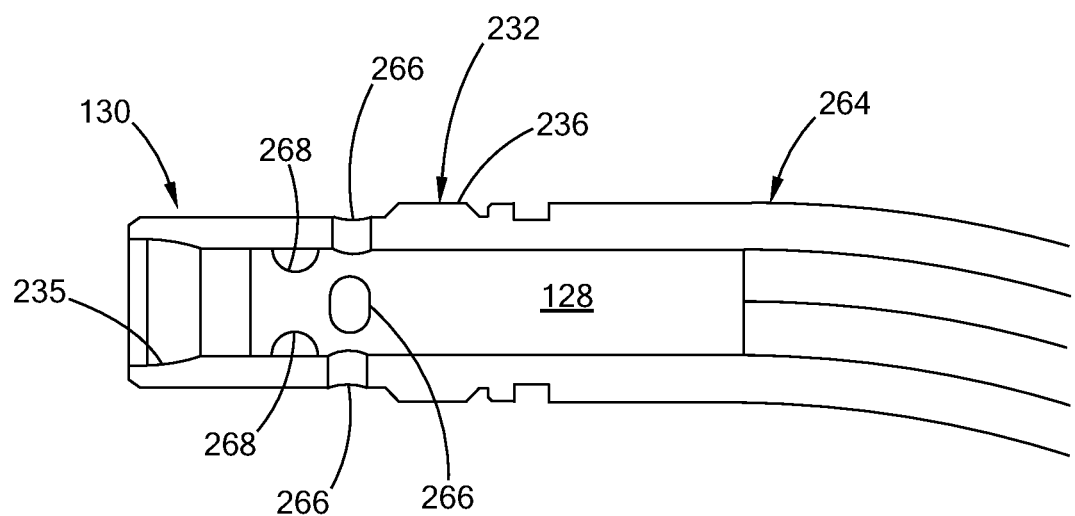
FIG. 19B is a profile and cross-sectional view of the conductor tube of an arc welding apparatus constructed in accordance with another embodiment of the present disclosure.

Referring to FIGS. 19A and 19B, the conductor tube 204 demonstrated in FIGS. 17 and 18 is shown in different variations still in accordance with the third embodiment of the present disclosure. FIG. 19A demonstrates an example of a conductor tube 260 variation. In this variation, the plurality of apertures 234 is formed as a plurality of slots 262. In yet another example, FIG. 19B demonstrates a conductor tube 264 having a plurality of slots 266 and a plurality of holes 268. The conductor tubes 260 and 264 shown in FIGS. 19A and 19B may have other variations similar to those demonstrated in FIGS. 9 to 13 similar to the contact tip diffusers to alter the dispersion and improve the coverage of shielding gas.

FIGS. 20A and 20B refer back to the consumable assembly 202 and the conductor tube 204 constructed in accordance with the third embodiment of the present disclosure, and further disclose an alignment device 270. The alignment device serves as a guide to center a conduit liner (not shown) similar to the conduit liner 32 introduced in FIGS. 2 to 4 within the internal passageway 128 inside the conductor tube 204 and along a longitudinal axis 272. The alignment device 270 positions the conduit liner and accordingly the wire such that the portion extending into the internal cavity 220 of the contact tip 206 is aligned with the elongated exit orifice 216 along the longitudinal axis 272.

The addition of the alignment device 270 to the third embodiment results in the conduit liner extending into the internal cavity 220 from an internal passage 274. The internal passage defines an internal tapered surface 276 disposed centrally in the alignment device 270. The alignment device 270 provides for the welding wire fed through the conduit liner to consistently enter a radiused inlet 60 and feed outward through the exit orifice 216. The alignment device improves operation of the arc welding apparatus 10 by reducing inconsistencies in feeding the welding wire through the contact tip 206.

The alignment device 270 further comprises a press fit surface 278 being pressed into the distal end portion 130 of the conductor tube 204 in a press fit cavity 280. The press fit surface 274 is shown having a chamfer 282 disposed around a proximal end 284 for ease of manufacture when being pressed into the distal end portion 130 of the conductor tube 204 and abutting the press fit cavity 276.

Referring to FIGS. 21A and 21B, the inner body 204 demonstrated in FIGS. 17 and 18 is shown in a different variation similar to the third embodiment of the present disclosure. An adaptor sleeve 286 having an internal cavity 288 defining cam lock parts 290 attaches to the conductor tube 204 of the third embodiment. The adaptor sleeve 206 further comprises a plurality of apertures 292 extending from an outer surface 294 to the internal cavity 288 and a plurality of threads 296 disposed around the outer surface for attachment to a nozzle (not shown) assembly similar to the nozzle 207 disclosed in the third embodiment. In the instant example the inner body 208 of the nozzle 207 attaches to the plurality of threads 296 and comprises an internal distal flange (not shown) to secure the contact tip 206 in conformity with the teachings of the disclosure.

Figure 22:
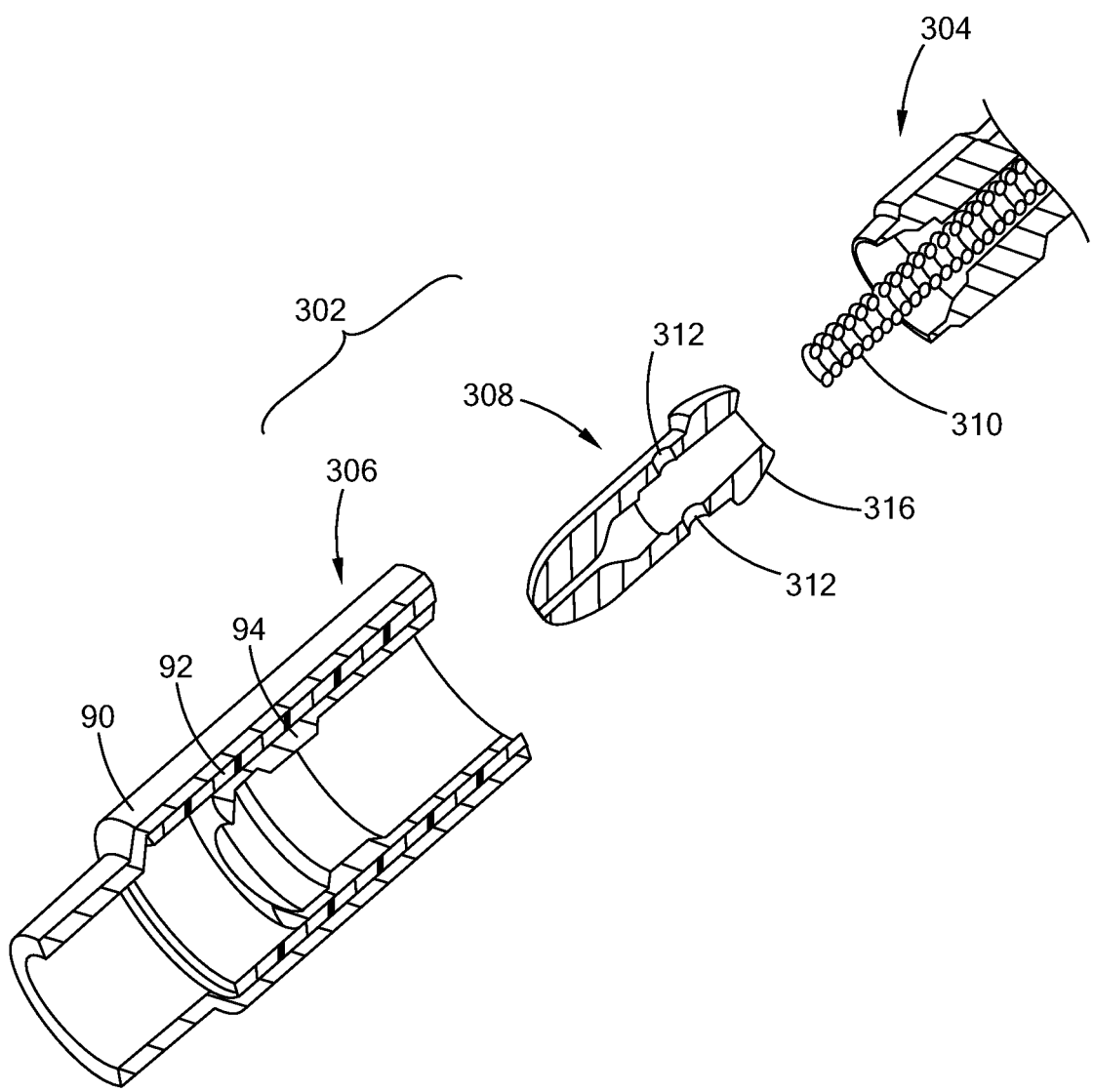
FIG. 22 is a perspective view of a contact tip-diffuser of a consumable assembly constructed in accordance with a fourth embodiment of the present disclosure.

Referring to FIG. 22, a consumable assembly 302 and a conductor tube 304 for use in the arc welding apparatus 10 of FIG. 1 and constructed in accordance with a fourth embodiment of the present disclosure are shown. The consumable assembly 302 includes a nozzle 306 and a contact tip-diffuser 308. A conduit liner 310 extends longitudinally through the conductor tube 304. The contact tip-diffuser 308 includes apertures 312 for diffusing shielding gas from inside the contact tip-diffuser 308 to outside of the contact tip-diffuser 308 and thus functions as both a contact tip and a gas diffuser in the present embodiment. The contact tip-diffuser 308 is structurally similar to the contact tip-diffuser 24 of FIG. 5 except that the proximal end portion 314 of the contact tip-diffuser 308 includes a spherical contact surface 316. Like reference numbers will be used for like parts as such these parts may function in a similar manner as previously described in this application.

Figure 23:
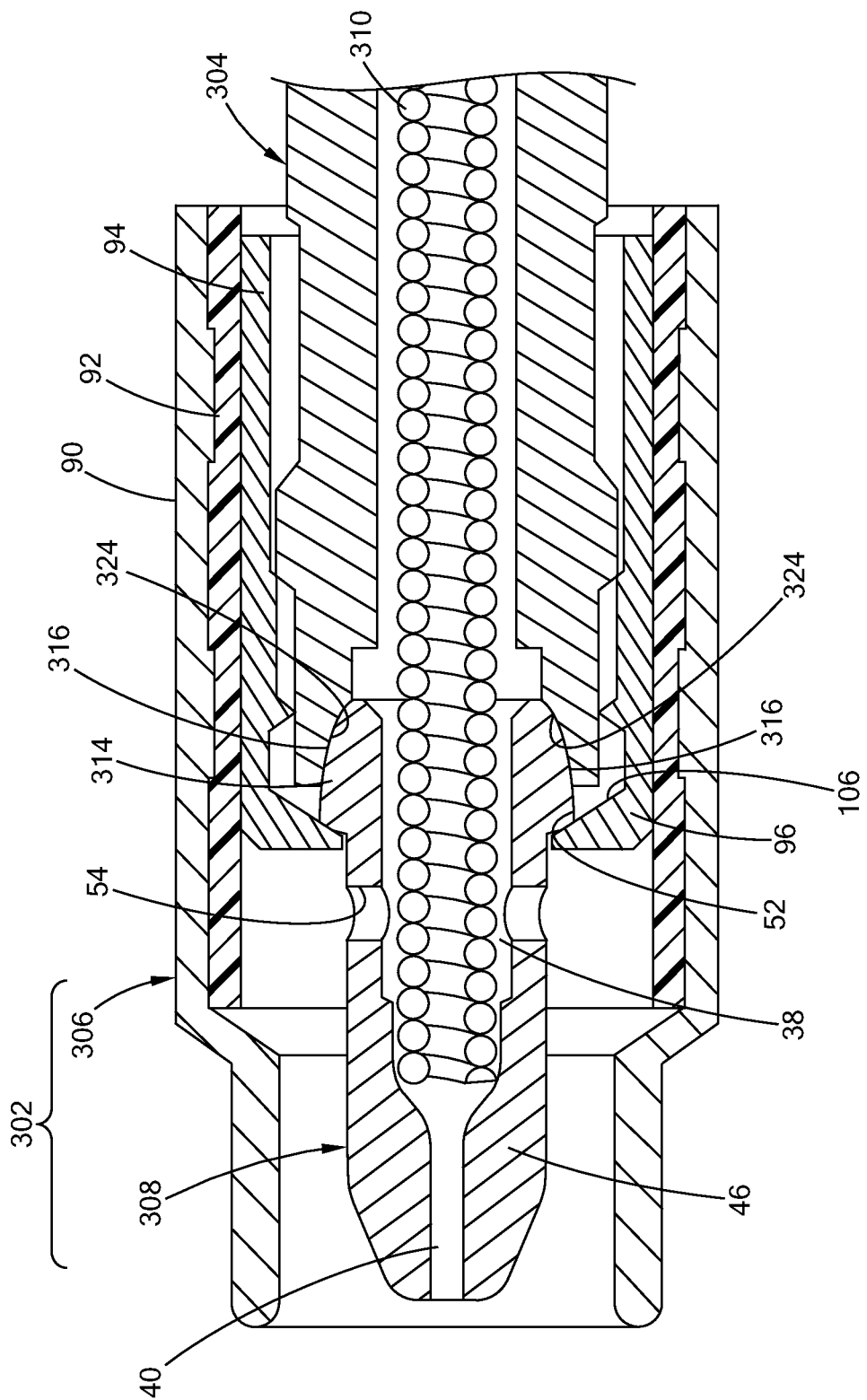
FIG. 23 is a cross-sectional view of a consumable assembly and a conductor tube constructed in accordance with a fifth embodiment of the present disclosure.

As clearly shown in FIG. 23, the contact tip-diffuser 308 includes a proximal end portion 314 defining an internal cavity 38 and a distal end portion 46 defining an elongated exit orifice 40. The proximal end portion 314 includes an external shoulder 52 and a spherical contact surface 316. Similarly, the contact tip-diffuser 308 has a plurality of apertures 54 extending radially through the proximal end portion 314 to diffuse shielding gas. Therefore, the consumable assembly 302 is suitable for heavy-duty (e.g., high amperage) welding operation.

The nozzle 306 has a structure similar to that the nozzle in FIG. 15. Like reference numbers are used for like parts and thus the description and the description thereof should be considered similar hereinafter to avoid redundancy.

The conductor tube 304 of the present embodiment is structurally similar to the conductor tube of FIG. 15, except that the conductor tube 304 defines a spherical contact surface 324 corresponding to the spherical contact surface 316 of the contact tip-diffuser 308. The spherical contacts surfaces 316 and 324 of the contact tip-diffuser 308 and the conductor tube 304 improve engagement between the tip/diffuser 308 and the conductor tube 304.

Figure 24:
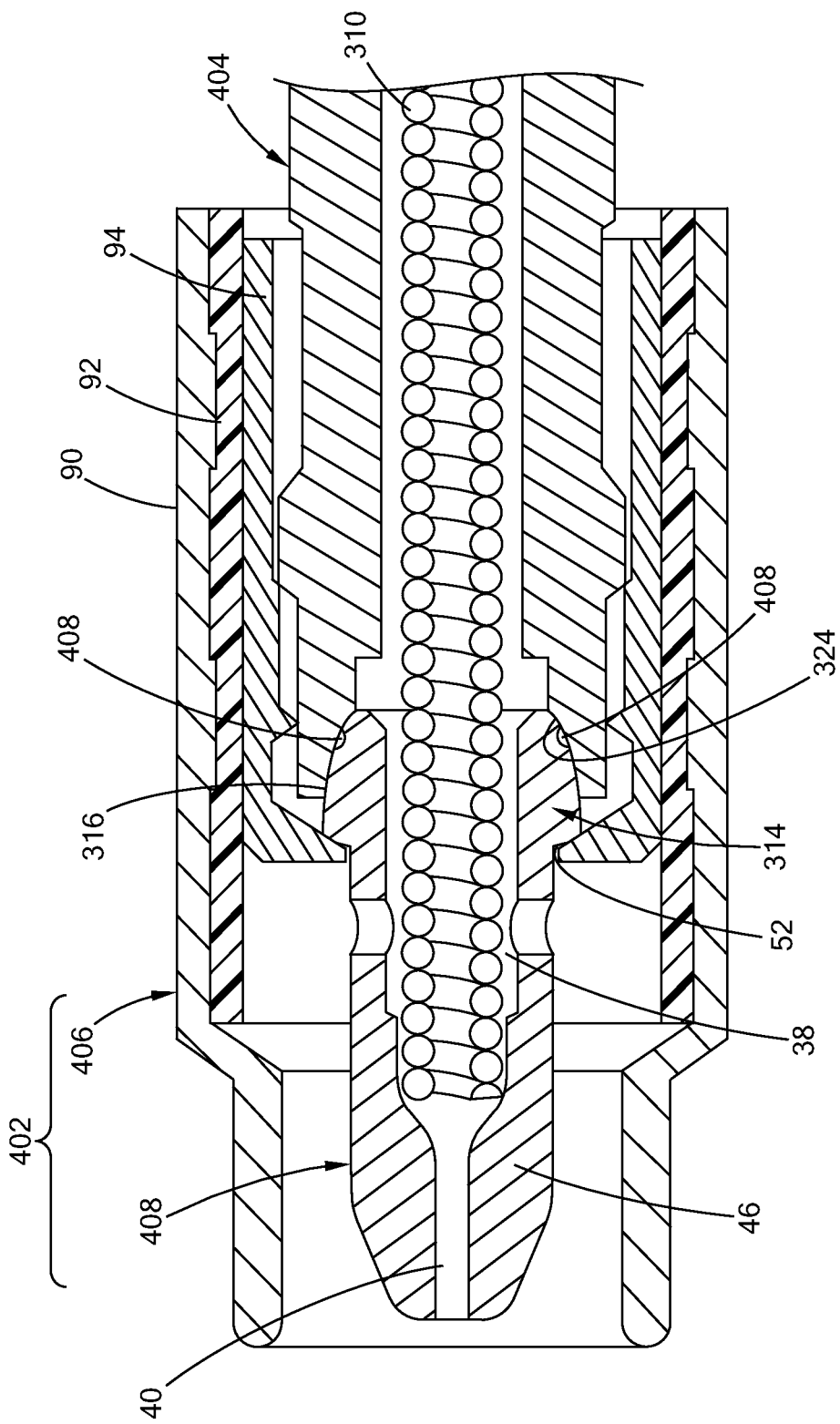
FIG. 24 is a cross-sectional view of a consumable assembly and a conductor tube constructed in accordance with a fifth embodiment of the present disclosure.
Figure 25:
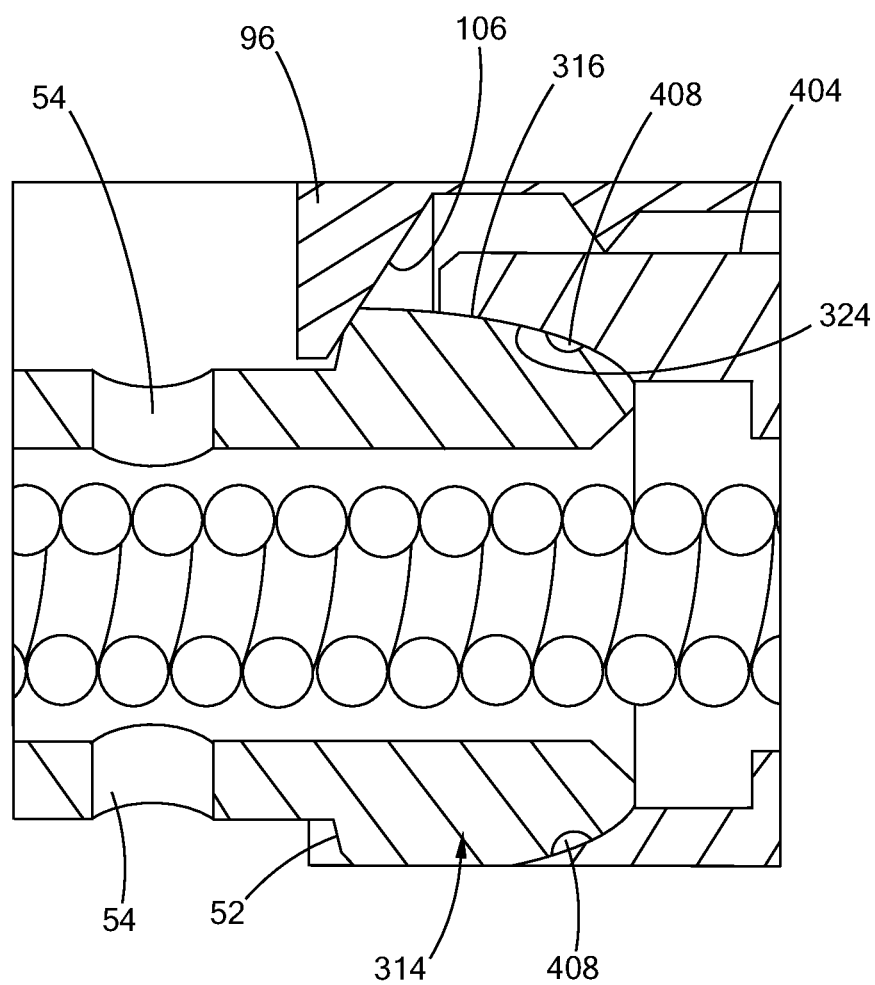
FIG. 25 is an enlarged view of FIG. 24, showing the interface between the contact tip-diffuser and the conductor tube.

Referring to FIGS. 23 to 25, a consumable assembly 402 and a conductor tube 404 for use in the arc welding apparatus 10 of FIG. 1 and constructed in accordance with a fifth embodiment of the present disclosure are shown. The consumable assembly 402 includes a contact tip-diffuser 404 and a nozzle 406. The contact tip-diffuser 404 is similar to the contact tip-diffuser 308 of FIGS. 15 to 16 except that the contact tip-diffuser 308 has an annular groove 408 formed in the spherical contact surface 316. Like reference numbers are used for like parts as such these parts may function in a similar manner as previously described in this application.

Similarly, the contact tip-diffuser 308 of the present disclosure has a proximal end portion 314 and a distal end portion 46. The proximal end portion 314 has an external shoulder 52 and a spherical contact surface 316. An annular groove 418 is formed along the circumference of the spherical contact surface 316.

As shown in FIG. 25, when contact-tip diffuser 308 and the conductor tube 404 are secured inside the nozzle 406, the spherical contact surface 316 of the contact tip-diffuser 404 is in close contact with the spherical contact surface 324 of the conductor tube 404. The annular groove 408 prevents possible locking of the contact tip-diffuser 404 to the conductor tube 404 due to thermal expansion of the spherical contact surfaces 316 and 324.

Figure 26:
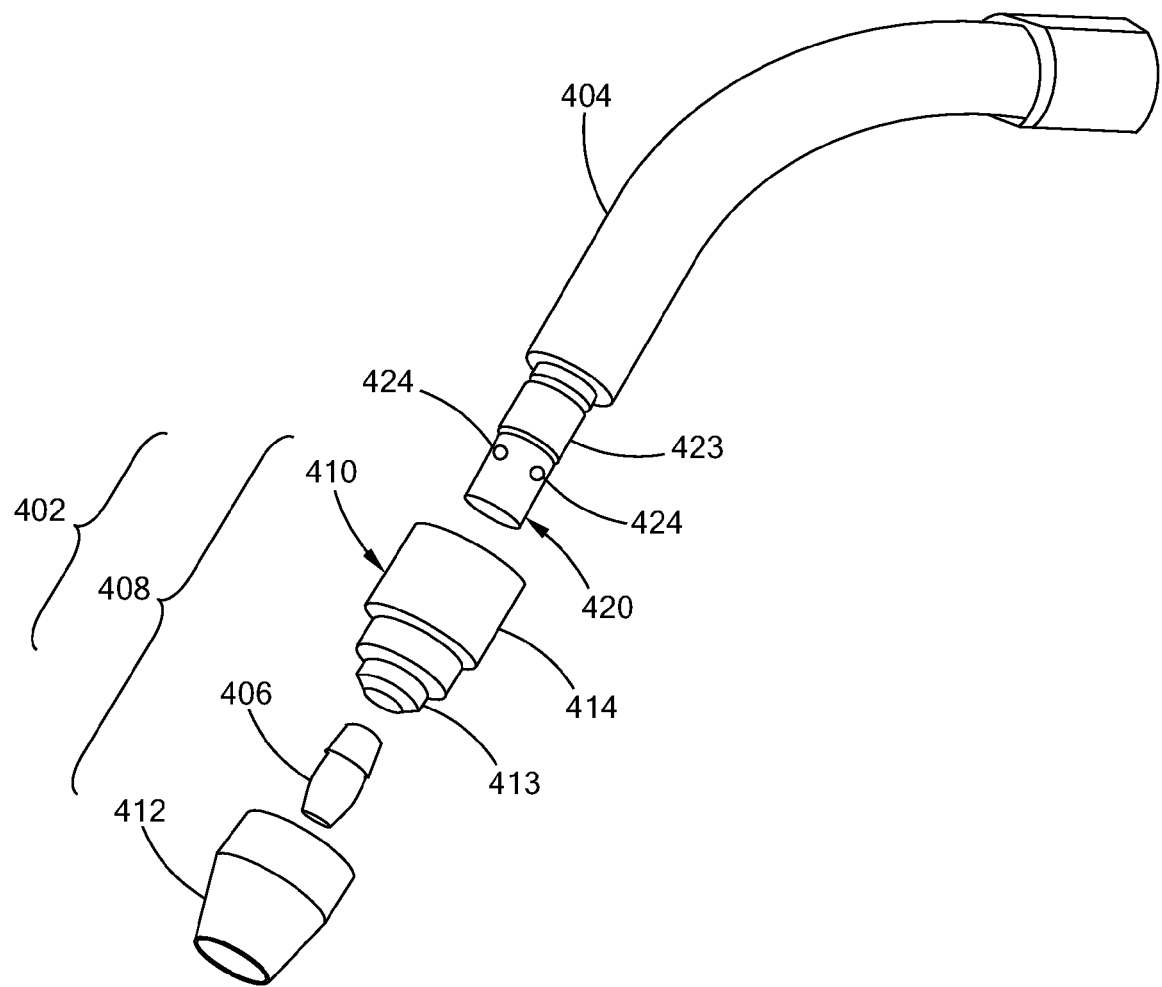
FIG. 26 is a perspective view of a consumable assembly and a conductor tube constructed in accordance with a sixth embodiment of the present disclosure.
Figure 27:
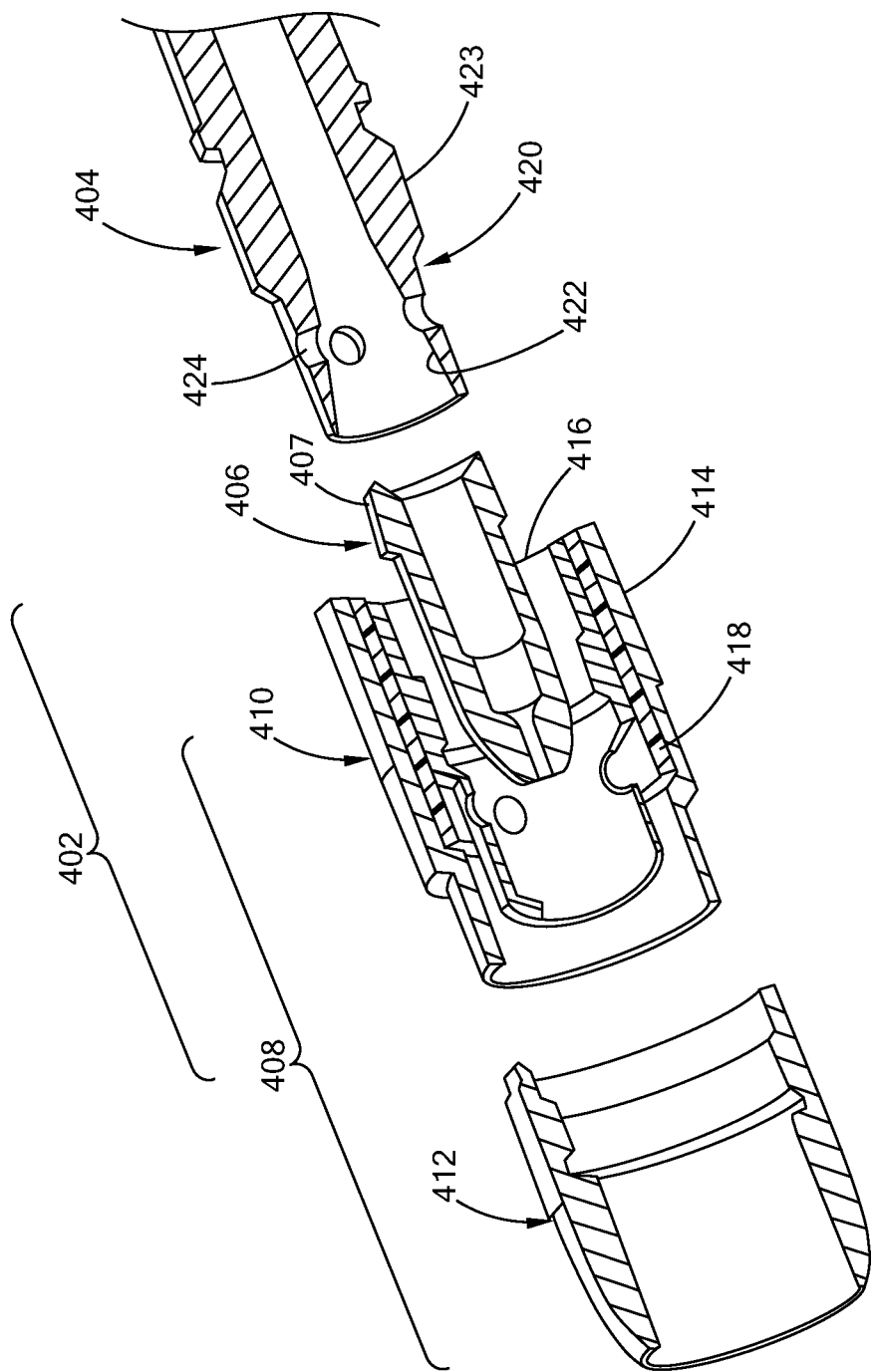
FIG. 27 is a partial exploded, cross-sectional and perspective view of a consumable assembly and a conductor tube constructed in accordance with a sixth embodiment of the present disclosure.

Referring to FIGS. 26 and 27, a consumable assembly 402 and a conductor tube 404 for used in the arc welding apparatus 10 of FIG. 1 and constructed in accordance with a sixth embodiment of the present disclosure is shown. The consumable assembly 402 includes a contact tip 406 and a nozzle assembly 408. The contact tip 406 is similar to the contact tip 122 in FIG. 16 and includes an external contact surface 407 that is tapered outwardly from the proximal end portion to the distal end portion.

The nozzle assembly 408 includes a nozzle housing 410 and a nozzle cup 412 mounted around a distal end 413 of the nozzle housing 410. The nozzle cup 412 may be assembled to the nozzle housing 410 through threaded connection, or quick disconnects, among other types of connections. The nozzle housing 410 includes an outer body 414, an inner body 416 and an insulator 418 disposed between the outer body 414 and the inner body 416. The inner body 414 functions as a tip holder for securing the contact tip 122.

The conductor tube 404 includes a distal end portion 420 having an internal contact surface 422 and an external connecting surface 423. The distal end portion 420 may be formed separately and molded to the main body of the conductor tube 404. Alternatively, the distal end portion 420 may be an integral part of the conductor tube 404. The internal contact surface 422 is tapered to match the external contact surface 407 of the contact tip 406. The external connecting surface 423 may have threads for threaded connection with the inner body 416 of the nozzle assembly 408. A plurality of apertures 424 extend through the internal contact surface 422. When the conductor tube 404 engages the contact tip 406, the internal tapered contact surface 422 of the conductor tube 404 is in close contact with the external tapered contact surface 407. The improved contact between the conductor tube 404 and the contact tip 406 improves heat transfer from the contact tip 406 to the conductor tube 404.

Figure 28:
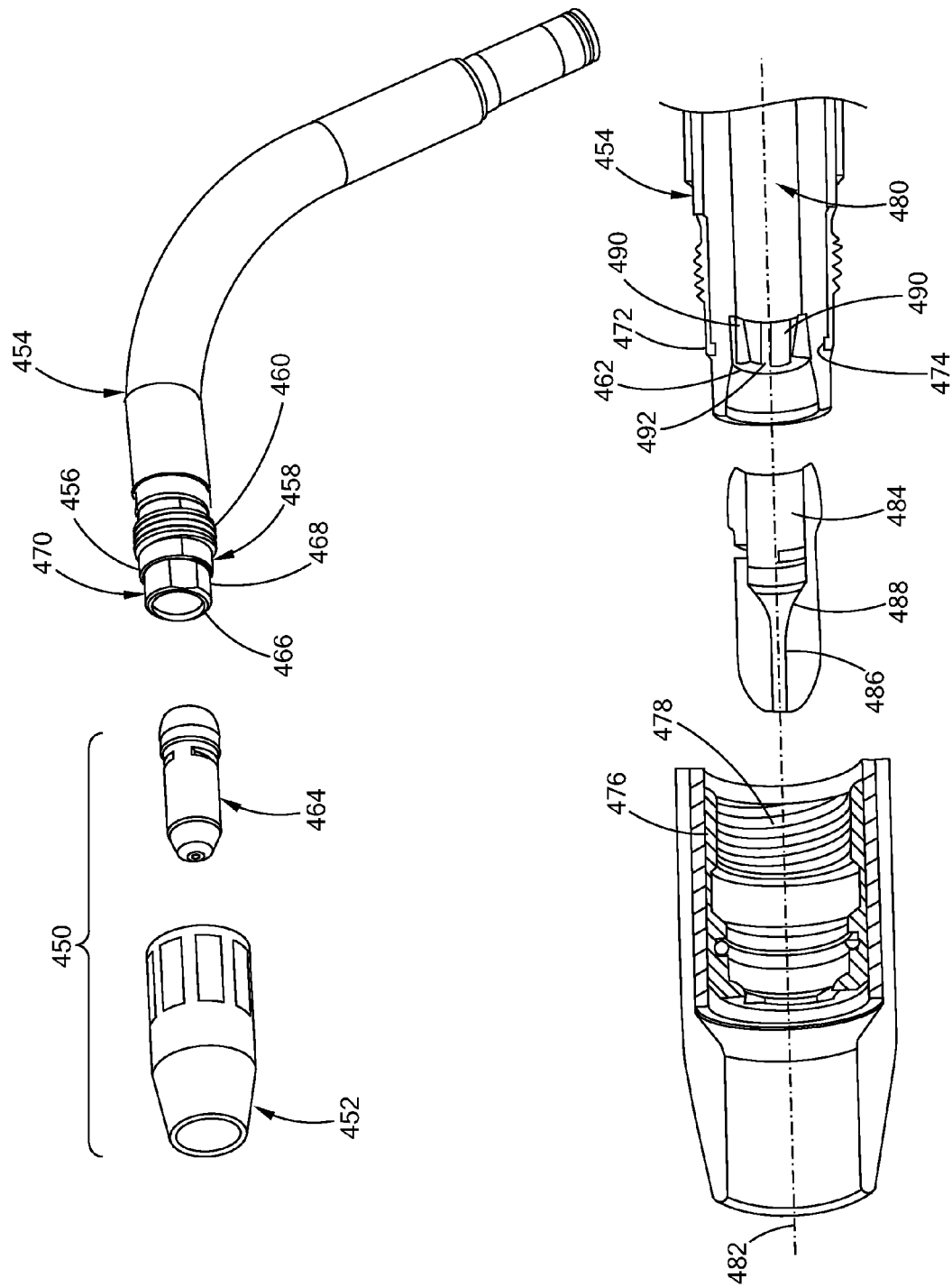
FIG. 28 is a partial exploded perspective view and partial exploded cross-sectional view of a consumable assembly and a conductor tube constructed in accordance with a seventh embodiment of the present disclosure.
Figure 29:
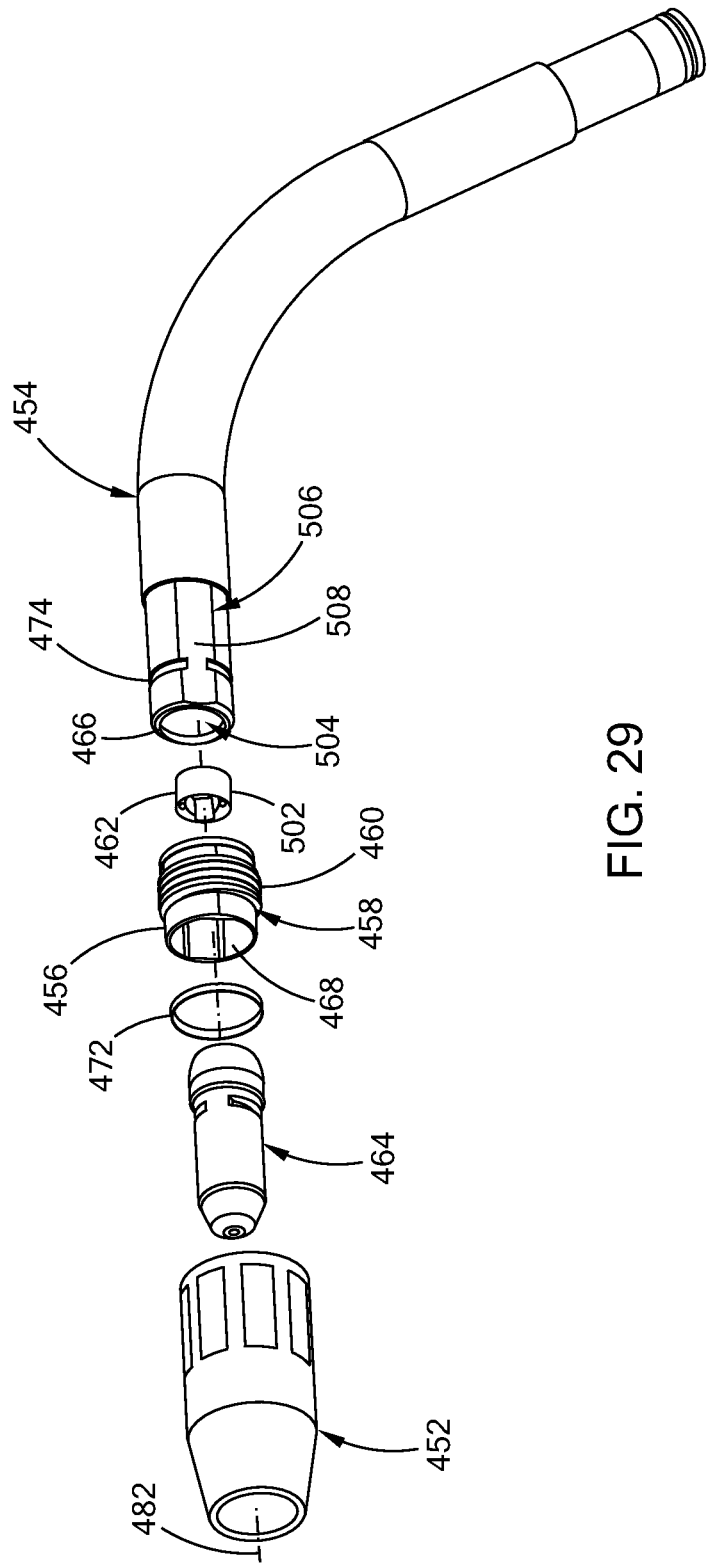
FIG. 29 is a partial exploded perspective view of a consumable assembly and a conductor tube constructed in accordance with a seventh embodiment of the present disclosure.
Figure 30:
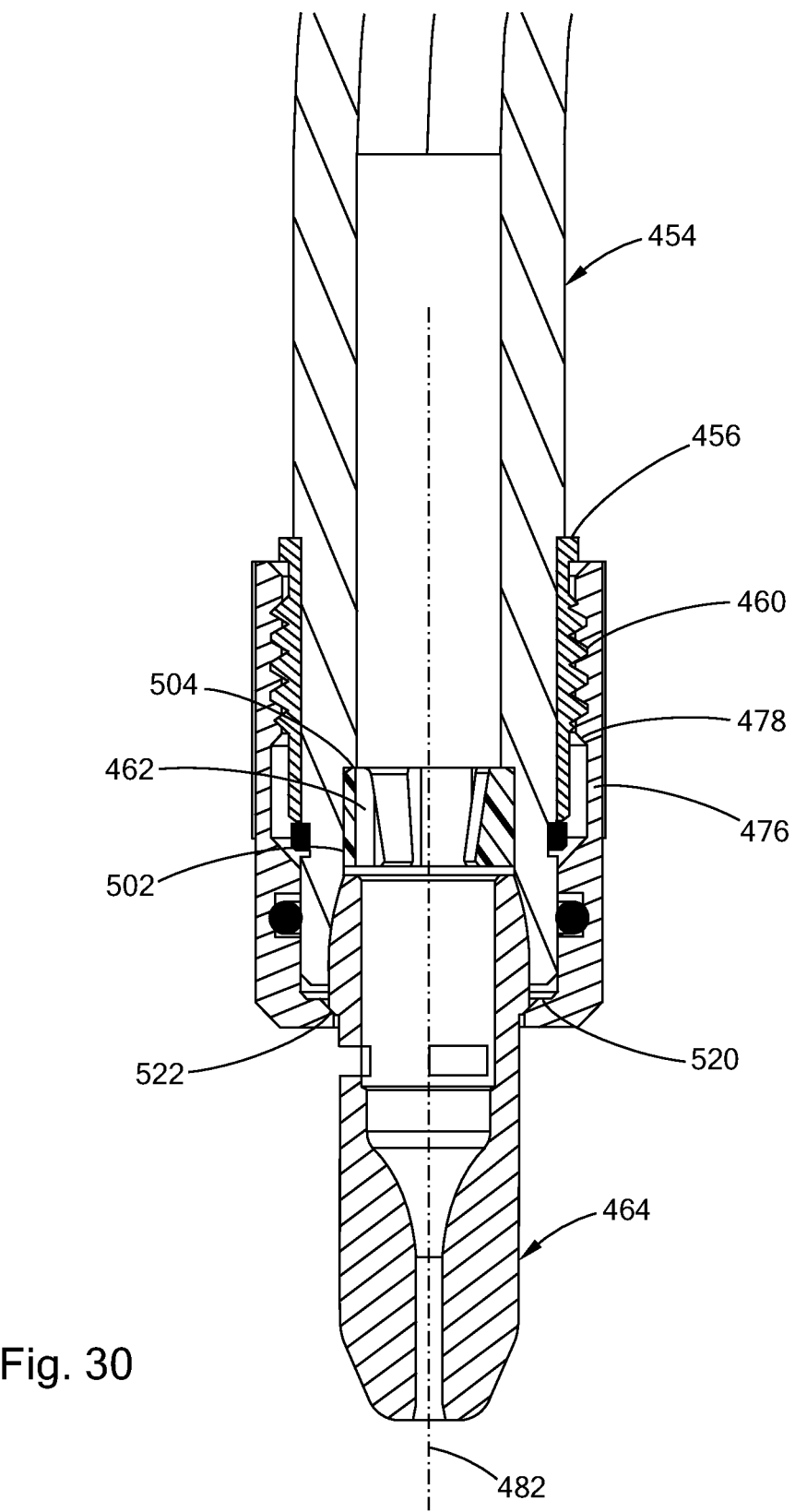
FIG. 30 is a cross-sectional view of a consumable assembly and a conductor tube constructed in accordance with a seventh embodiment of the present disclosure.

FIGS. 28 to 30 refer to a consumable assembly 450 and a conductor tube 452 for use in the arc welding apparatus 10 of FIG. 1 and constructed in accordance with a seventh embodiment of the present disclosure. Referring to FIG. 28, a consumable assembly 450 is similar to the consumable assembly 16 of the first embodiment and as such these parts may function in a similar manner as previously described in this application. A nozzle assembly 452 attaches to a conductor tube 454 through an intermediate connection in the form of a sleeve 456 and an engaging portion 458 comprising a plurality of threads 460. The instant implementations additionally incorporates an alignment device 462 disposed in the conductor tube 454 to align a conduit liner with a contact diffuser tip 464. This embodiment provides for an alternative means of connecting the disposable assembly 450 to the conductor tube 454 with an added benefit of a replaceable sleeve 456 to allow for replacement of the plurality of threads 460 without replacing the conductor tube 454.

The sleeve 456 engages the distal end 466 of the conductor tube 454. An inner surface profile 468 of the sleeve 456 is configured to slide over an external surface profile 470 of the conductor tube 454. The sleeve 456 is further held in position by a locking ring 472 disposed in an annular groove 474. The engaging portion 458 of the sleeve 456 comprises the plurality of threads 460 that connects to an inner body portion 476 of the nozzle assembly 452 also comprising a plurality of threads 478.

Still referring to FIG. 28, the alignment device 462 serves to center a conduit liner (not shown) similar to the conduit liner 310 introduced in FIG. 20 within an internal passageway 480 inside the conductor tube 454 along a longitudinal axis 482. The alignment device 462 positions the conduit liner such that the portion extending into the internal cavity 484 of the contact tip diffuser 464 is aligned with the exit orifice 486 along the longitudinal axis 482. The addition of alignment device 462 to this embodiment results in the conduit liner extending into the internal cavity 484 providing for the welding wire fed through the conduit liner to consistently enter a radiused inlet 488 and be fed out through the exit orifice 486.

Another feature of the alignment device 462 disclosed in the seventh embodiment is a plurality of ports 490 bordering on an internal passage 492. The conduit liner is disposed in the internal passage 492 to align the conduit liner with the internal cavity 484 of the contact tip diffuser 464 and the plurality of ports 490 provides increased cross-sectional area within the conductor tube 454. The increased cross-sectional area ensures that the alignment device 462 does not restrict the flow of shielding gas through the conductor tube 454.

Referring now to FIG. 29, the alignment device 462 comprises a press fit surface 502 is pressed into the distal end 466 of the conductor tube 454 into a press fit cavity 504. The distal end 466 of the conductor tube 454 further defines an external surface profile 506 that is significantly circular having a radial alignment mechanism such as a flat, tab, keyed-slot, or groove. In this example a flat 508 is disposed on two opposing sides for radial alignment. The inner profile 468 of the sleeve 456 is configured to slidably engage the external surface profile 508 such that the sleeve 456 can slide along the longitudinal axis 482, but is restricted from rotating around the conductor tube 454. Finally, to restrict motion along the longitudinal axis, the locking ring 472 is disposed in the annular groove 474. With the locking ring 472 in place, the sleeve 456 is sufficiently restrained. The contact tip diffuser 464 engages the distal end 466 of the conductor tube 454 and the inner body 476 of the nozzle assembly 452 connects to the engaging portion 458 of the sleeve 456 through the mating surfaces of each of the plurality of threads 460 and 478.

The assembly of the instant embodiment of the welding apparatus is further detailed in an assembled, cross-sectional view shown in FIG. 30 with only the inner body 476 of the nozzle assembly 452 shown for clarity. To retain the position of the contact tip diffuser, the inner body 476 further defines an internal distal flange 520 that abuts an external shoulder 522 of the contact tip diffuser 464 and retains the position of the contact tip diffuser 464. The engaging portion 458 of the sleeve 456 defined as the plurality of threads 460 is clearly shown engaging the plurality of threads 478 of the inner body 476. Further, the press fit cavity 504 of the conductor tube is shown to demonstrate the press fit surface 502 of the alignment device 462 assembled according to the instant embodiment.

Still in accordance with the seventh embodiment of the disclosure FIG. 31A illustrates the connection of the sleeve 456 and the conductor tube 454. The external surface profile 506 at the distal end 466 of the conductor tube 454 comprises a flat 508 on two opposing sides. The inner surface profile 468 of the sleeve 456 is configured to slidably engage the external surface profile 506 such that the sleeve 456 can slide along the longitudinal axis 482, but is restricted from rotating around the conductor tube 454. The engaging portion 458 and the plurality of threads 460 are also shown in FIG. 31A to provide further detail.

Similar to the seventh embodiment of the disclosure and relating back to the aforementioned embodiments, a different variation of a sleeve 550 and a conductor tube 552 are shown in FIG. 31B. In this example an external surface profile 554 of the conductor tube is defined as having a key slot 556 and a key 558 to engage an inner surface profile 560 of the sleeve 550. In the instant example, the sleeve 550 engages the distal end 562 of the conductor tube 552 and is restricted from rotation about the conductor tube 552 with the key 558 disposed in the key slot 556 and in the inner surface profile 560 of the sleeve 550. The conductor tube 552 may similarly be configured to engage an inner surface profile of a sleeve through a spline coupling. Further the engaging portion 564 of the sleeve 550 is defined as cam lock parts 566. Similar to the first embodiment, the cam lock parts 566 engage an inner body of a nozzle assembly (not shown) rather than the plurality of threads 460 in the consumable assembly of the seventh embodiment.

In yet another implementation of the seventh embodiment of the disclosure and relating back to the aforementioned embodiments, a different variation of a conductor tube 568 and a sleeve 570 are shown in FIG. 32. This variation is similar to that disclosed in FIG. 31A, but includes a set screw 572 as a means of securing the sleeve 570 to the conductor tube 568. The set screw 572 is disposed in a hole 574 in the sleeve 570 and a threaded hole 576 in the conductor tube 568 to secure the sleeve 570 to the conductor tube 568. This implementation may further include the sleeve 570 having an elongated surface 578 that extends at least to the distal end 466 of the conductor tube 568 when assembled. The instant implementation applies the sleeve 570 to protect the distal end 466 of the conductor tube 568 from wear and protect the distal end 466 from impact.

Referring back to the seventh embodiment introduced in FIG. 28, FIG. 33A illustrates the alignment device 462. The plurality of ports 490 is clearly depicted as being evenly spaced around and bordering the internal passage 492. The even spacing of the plurality of ports allows for consistent passage of shielding gas through alignment device 462. Further, the press fit surface 502 is shown having a chamfer 602 disposed in a proximal end 604 for ease of manufacture when being pressed into the distal end 466 of the conductor tube 454 and abutting the press fit cavity 504.

Referring now to FIGS. 33B and 33C, different variations of the alignment device 462 similar to seventh embodiment are shown providing alternate embodiments that can be incorporated from the aforementioned teachings of this disclosure. The alignment device 606 shown in FIG. 33B has a plurality of ports 608 disposed within the wall 610 of the alignment device 606. Further, instead of having a press fit surface 502 as disclosed in the seventh embodiment, the instant example has as an outer surface 612 defining a plurality of threads 614 configured to connect to a threaded surface disposed in a conductor tube.

The alignment device 616 shown in FIG. 32B has a plurality of ports 618 such that when the alignment device 616 is disposed in a conductor tube (not shown), the plurality of ports 618 border an interior surface 619 (shown as a dotted line) of the conductor tube. Further, an outer surface 620 is disposed around the alignment device 616 and comprises cam lock parts 622. In this example, the interior surface of the conductor tube further defines an engaging portion configured to engage the cam lock parts 622 and retain the alignment device 616. The previous examples are not suggested to limit other variations and are presented to teach possible embodiments of this disclosure.

The present disclosure is merely exemplary in nature and, thus, variations that do not depart from the spirit of the disclosure are intended to be within the scope of the present disclosure. Such variations are not to be regarded as a departure from the scope contemplated in the present disclosure.

What is claimed is:

1. An arc welding apparatus comprising:
   a conductor tube defining an internal passageway comprising an external surface profile and a distal end portion; and
   a sleeve having inner and outer surface profiles, the inner surface profile including a set of substantially flat surfaces oriented substantially parallel to a longitudinal axis of the sleeve and configured to abut the external surface profile of the conductor tube around the distal end portion of the conductor tube, and the outer surface profile comprising an engaging portion.

2. The arc welding apparatus according to claim 1, wherein the engaging portion of the sleeve defines a surface configured for mechanical connection.

3. The arc welding apparatus according to claim 2, wherein the mechanical connection defines a plurality of threads.

4. The arc welding apparatus according to claim 1, wherein the sleeve is secured to the conductor tube by at least one fastener.

5. The arc welding apparatus according to claim 1, wherein the sleeve extends at least to the distal end of the conductor tube in relation to the longitudinal axis.

6. The arc welding apparatus according to claim 1, further comprising a nozzle having an inner body, the inner body comprising an inner profile configured to mechanically attach to the outer surface of the conductor tube.

7. The arc welding apparatus according to claim 6, wherein the inner body of the nozzle defines an internal distal flange configured to abut an external shoulder of a contact tip.

8. An arc welding apparatus comprising:
   a conductor tube defining an internal passageway comprising an external surface profile and a distal end;
   a sleeve having inner and outer surface profiles, the inner surface profile including a set of substantially flat surfaces oriented substantially parallel to a longitudinal axis of the sleeve and configured to abut the external surface profile of the conductor tube around the distal end portion of the conductor tube, and the outer surface profile comprising a connection surface configured for mechanical connection;
   a nozzle having an inner body, the inner body comprising an inner profile configured to mechanically attach to the connection surface of the sleeve, and a distal end having an internal distal flange; and
   a contact tip comprising an external shoulder configured to abut the internal distal flange to secure and position the contact tip.

9. The arc welding apparatus according to claim 8, wherein the connection surface of the sleeve comprises a plurality of threads.

10. The welding apparatus according to claim 8, wherein the external surface profile of the conductor tube is configured to slidably engage the sleeve and restrict rotation about the longitudinal axis of the conductor tube.

11. The arc welding apparatus according to claim 1, wherein the conductor tube further defines at least one threaded hole.

12. The arc welding apparatus according to claim 11, wherein the sleeve further defines at least one hole for alignment with the at least one threaded hole of the conductor tube.

13. The arc welding apparatus according to claim 12, further comprises at least one fastener engaging through the hole of the sleeve and engaging into the at least one threaded hole of the conductor tube for securing the sleeve on the conductor tube.

14. The arc welding apparatus according to claim 1, wherein the sleeve further defines an elongated surface extending distally from the engagement portion.

15. The arc welding apparatus according to claim 8, wherein the conductor tube further defines at least one threaded hole.

16. The arc welding apparatus according to claim 15, wherein the sleeve further defines at least one hole for alignment with the at least one threaded hole of the conductor tube.

17. The arc welding apparatus according to claim 16, further comprises at least one fastener engaging through the hole of the sleeve and engaging into the at least one threaded hole of the conductor tube for securing the sleeve on the conductor tube.

18. The arc welding apparatus according to claim 9, wherein the sleeve further defines an elongated surface extending distally from the plurality of threads.

* * * * *